United States Patent
Greenwood et al.

(10) Patent No.: US 11,093,148 B1
(45) Date of Patent: *Aug. 17, 2021

(54) ACCELERATED VOLUMES

(71) Applicant: Amazon Technologies, Inc., Seattle, WA (US)

(72) Inventors: Christopher Magee Greenwood, Seattle, WA (US); Kiran-Kumar Muniswamy-Reddy, Kirkland, WA (US); Igor A. Kostic, Kirkland, WA (US); Wells Lin, Seattle, WA (US); Danny Wei, Seattle, WA (US); Colin Williams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,097

(22) Filed: Aug. 23, 2019

Related U.S. Application Data

(63) Continuation of application No. 15/934,608, filed on Mar. 23, 2018, now Pat. No. 10,452,296.

(51) Int. Cl.
*G06F 3/06* (2006.01)
*G06F 16/11* (2019.01)
(Continued)

(52) U.S. Cl.
CPC ............ *G06F 3/064* (2013.01); *G06F 9/4416* (2013.01); *G06F 9/5011* (2013.01);
(Continued)

(58) Field of Classification Search
CPC .... G06F 3/0604; G06F 9/5011; G06F 16/128; G06F 9/4416; G06F 2201/84; H04L 67/2842
(Continued)

(56) References Cited

U.S. PATENT DOCUMENTS 5,434,994 A 7/1995 Shaheen et al.
5,574,878 A 11/1996 Onodera et al.
(Continued)

FOREIGN PATENT DOCUMENTS

| WO | WO 2011/088261 | 7/2011 |
| WO | WO 2017/028885 A1 | 2/2017 |
| WO | WO 2019/212768 A1 | 7/2019 |

OTHER PUBLICATIONS

"Amazon EBS API and Command Overview", downloaded Jul. 11, 2013 from doc.aws.amazon.com/AWSEC2/latesl/UserGuide/ebs-api-cli--Overview.html, p. 1.
(Continued)

*Primary Examiner* — Hua J Song
(74) *Attorney, Agent, or Firm* — Knobbe, Martens, Olson & Bear, LLP

(57) ABSTRACT

A snapshot object or other type of object may be stored in a first storage system and may be accelerated in another storage system, wherein an accelerated snapshot or other type of object can be used to populate volumes in the other storage system with data more rapidly than a non-accelerated snapshot or other type of object. The accelerated snapshot or other object may be implemented using an intermediate volume implemented in the other storage system that is populated with data from the snapshot object or the other object stored in the first storage system.

20 Claims, 16 Drawing Sheets

(51) Int. Cl.
*G06F 9/4401* (2018.01)
*H04L 29/08* (2006.01)
*G06F 9/50* (2006.01)

(52) U.S. Cl.
CPC ........ *G06F 16/128* (2019.01); *H04L 67/2842* (2013.01); *G06F 2201/84* (2013.01)

(58) Field of Classification Search
USPC ........................................................ 711/154
See application file for complete search history.

(56) References Cited

U.S. PATENT DOCUMENTS

| | | |
|---|---|---|
| 6,463,509 B1 | 10/2002 | Teoman |
| 7,502,960 B1 | 3/2009 | Todd et al. |
| 7,788,664 B1 | 8/2010 | Janakiraman et al. |
| 7,895,261 B2 | 2/2011 | Jones et al. |
| 7,975,102 B1 | 7/2011 | Hyer et al. |
| 8,280,853 B1 | 10/2012 | Lai et al. |
| 8,285,687 B2 | 10/2012 | Voll et al. |
| 8,589,574 B1 | 11/2013 | Cormie et al. |
| 8,688,660 B1 | 4/2014 | Swaminathan |
| 8,725,968 B2 | 5/2014 | Wada |
| 8,849,758 B1 | 9/2014 | Sivasubramanian et al. |
| 9,003,227 B1 | 4/2015 | Patel et al. |
| 9,110,600 B1 | 8/2015 | Brooker |
| 9,246,996 B1 | 1/2016 | Brooker |
| 9,503,517 B1 | 11/2016 | Brooker |
| 9,563,385 B1 | 2/2017 | Kowalski et al. |
| 9,665,307 B1 | 5/2017 | LeCrone et al. |
| 9,720,620 B1 | 8/2017 | Wei et al. |
| 9,823,840 B1 | 11/2017 | Brooker et al. |
| 9,826,030 B1 | 11/2017 | Dhoolam et al. |
| 9,946,604 B1 | 4/2018 | Glass |
| 10,055,352 B2 | 8/2018 | Wei et al. |
| 10,459,655 B1 | 10/2019 | Greenwood et al. |
| 10,505,862 B1 | 12/2019 | Dhoolam et al. |
| 10,768,850 B2 | 9/2020 | Muniswamy-Reddy et al. |
| 2002/0059253 A1 | 5/2002 | Albazz et al. |
| 2002/0144070 A1 | 10/2002 | Watanabe et al. |
| 2003/0028737 A1 | 2/2003 | Kaiya et al. |
| 2003/0050974 A1 | 3/2003 | Mani-Meitav et al. |
| 2003/0191930 A1 | 10/2003 | Viljoen et al. |
| 2003/0204597 A1 | 10/2003 | Arakawa et al. |
| 2004/0078419 A1 | 4/2004 | Ferrari et al. |
| 2005/0193113 A1 | 9/2005 | Kokusho et al. |
| 2006/0271530 A1 | 11/2006 | Bauer |
| 2008/0086616 A1 | 4/2008 | Asano et al. |
| 2008/0126699 A1 | 5/2008 | Sangapu et al. |
| 2008/0140883 A1 | 6/2008 | Salessi et al. |
| 2008/0140905 A1 | 6/2008 | Okuyama |
| 2009/0077140 A1 | 3/2009 | Anglin et al. |
| 2009/0222632 A1 | 9/2009 | Sasage et al. |
| 2009/0228889 A1 | 9/2009 | Yoshiba |
| 2009/0249470 A1 | 10/2009 | Litvin et al. |
| 2010/0037009 A1 | 2/2010 | Yano et al. |
| 2010/0070725 A1 | 3/2010 | Prahlad et al. |
| 2010/0191922 A1 | 7/2010 | Dickey et al. |
| 2010/0312983 A1 | 12/2010 | Moon et al. |
| 2011/0191554 A1 | 8/2011 | Sakai et al. |
| 2012/0030318 A1 | 2/2012 | Ryder |
| 2012/0030343 A1 | 2/2012 | Ryder |
| 2012/0079221 A1* | 3/2012 | Sivasubramanian ........................ G06F 3/0619 711/162 |
| 2012/0079505 A1 | 3/2012 | Tarta et al. |
| 2012/0215835 A1 | 8/2012 | Takano et al. |
| 2012/0246511 A1 | 9/2012 | Sato |
| 2012/0254687 A1 | 10/2012 | Leggette et al. |
| 2012/0303576 A1 | 11/2012 | Calder et al. |
| 2013/0007753 A1 | 1/2013 | Jain |
| 2013/0036091 A1 | 2/2013 | Provenzano et al. |
| 2013/0046966 A1 | 2/2013 | Chu et al. |
| 2013/0054890 A1 | 2/2013 | Desai et al. |
| 2013/0055248 A1 | 2/2013 | Sokolinski et al. |
| 2013/0086585 A1 | 4/2013 | Huang et al. |
| 2013/0104126 A1 | 4/2013 | Padmanabhuni et al. |
| 2013/0198459 A1 | 8/2013 | Joshi et al. |
| 2013/0268575 A1 | 10/2013 | Xu |
| 2013/0304903 A1 | 11/2013 | Mick et al. |
| 2014/0136482 A1 | 5/2014 | Rochette |
| 2014/0181046 A1 | 6/2014 | Pawar et al. |
| 2014/0280441 A1 | 9/2014 | Jacobson et al. |
| 2014/0351636 A1 | 11/2014 | Yin |
| 2014/0359130 A1 | 12/2014 | Southern et al. |
| 2015/0128053 A1 | 5/2015 | Bragstad et al. |
| 2015/0134615 A1 | 5/2015 | Goodman et al. |
| 2015/0134723 A1 | 5/2015 | Kansal et al. |
| 2015/0139168 A1 | 5/2015 | Zhi et al. |
| 2015/0160885 A1 | 6/2015 | Hara et al. |
| 2015/0286432 A1 | 10/2015 | Dain et al. |
| 2015/0370483 A1 | 12/2015 | Schoebel-Theuer |
| 2016/0026395 A1 | 1/2016 | Lee |
| 2016/0036938 A1 | 2/2016 | Aviles et al. |
| 2016/0085651 A1 | 3/2016 | Factor et al. |
| 2016/0224244 A1 | 8/2016 | Gensler et al. |
| 2016/0291889 A1 | 10/2016 | Dawson et al. |
| 2017/0024764 A1 | 1/2017 | Mooser et al. |
| 2017/0147243 A1 | 5/2017 | Kowalski et al. |
| 2017/0192857 A1 | 7/2017 | Meiri et al. |
| 2017/0222935 A1 | 8/2017 | Kalman et al. |
| 2017/0237809 A1 | 8/2017 | Farinacci et al. |
| 2017/0329528 A1 | 11/2017 | Wei et al. |
| 2018/0173874 A1 | 6/2018 | Muttik et al. |
| 2018/0329935 A1 | 11/2018 | Mugali |
| 2018/0359336 A1 | 12/2018 | Chattopadhyay et al. |
| 2019/0042636 A1 | 2/2019 | Sipka et al. |
| 2019/0332269 A1 | 10/2019 | Greenwood et al. |
| 2019/0347352 A1 | 11/2019 | Gochkov et al. |
| 2020/0142596 A1 | 5/2020 | Greenwood et al. |

OTHER PUBLICATIONS

"AMI Basics" downloaded Jul. 11, 2013 from doc.aws.amazon.com/AWSEC2/latesl/UserGuide/ComponentsAMIs.html, p. 1-2.
"AWS Amazon Elastic Block Store {EBS)'Persistent Storage" downloaded Jul. 11, 2013 from aws.amazon.com/ebs/, pp. 1-4.
"Cloudiquity" Published Mar. 12, 2009, Amazon Web Services and Cloud, pp. 1-4.
"Feature Guide: Elastic Block Store: Articles & Tutorials: Amazon Web Services" downloaded Jul. 11, 2013 from aws.mazon.com/articles/1667, pp. 1-7.
VMware; Carl Waldspurger; Memory Resource Management in WMware ESX Server; pp. 1-24, Dec. 10, 2002.
HP; Chris Hyser et al.; Autonomic Virtual Machine Placement in the Data Center; pp. 1-10, Feb. 26, 2008; HP Laboratories.
SwinBrain. "Database Management System Introduction". Nov. 17, 2009. Also available at http://swinbrain.icl.swin.edu.au/wiki/Database_Management_Systems_Introduction.
Amazon S3 Storage Services Guide—Developer Guide {API Version Mar. 1, 2006). Can be accessed at http://docs.aws.amazon.com/AmazonS3.latesl/dev/Welcome.html.
Reich et al. VMTorrent: Scalable P2P Virtual Machine Streaming _ Dec. 10-13, 2012.
U.S. Appl. No. 15/425,857, filed Feb. 6, 2017, Marcin Piotr Kowalski et al.
U.S. Appl. No. 12/892,742, filed Sep. 28, 2010, Swaminathan Sivasubramanian et al.
U.S. Appl. No. 12/892,735, filed Sep. 28, 2010, Swaminathan Sivasubramanian et al.
U.S. Appl. No. 14/205,067, filed Mar. 11, 2014, Danny Wei et al.
U.S. Appl. No. 14/204,992, filed Mar. 11, 2014, Danny Wei et al.
U.S. Appl. No. 14/625,535, filed Feb. 18, 2015, Surya Prakash Dhoolam et al.
Search Report and Written Opinion issued in PCT/US2019/028320, dated Jul. 8, 2019.
U.S. Appl. No. 15/967,023, filed Apr. 4, 2018, Kiran-Kumar Muniswamy-Reddy.
U.S. Appl. No. 15/967,025, filed Apr. 30, 2018, Christopher Magee Greenwood.

(56) References Cited

OTHER PUBLICATIONS

U.S. Appl. No. 15/967,284, filed Apr. 30, 2018, Christopher Magee Greenwood.
U.S. Appl. No. 16/049,620, filed Jul. 30, 2018, Pavel Labovich.
International Preliminary Report on Patentability issued in PCT/US2019/028320, dated Nov. 3, 2020.
NLP IP (htttps://iq.ip.com/discover search results) (Year: 2020).
Xia et al., Taming IO Spikes in Enterprise and Campus VM Deployment Jun. 2014.

* cited by examiner

ACCELERATED VOLUMES

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware.

Virtualized computing environments are frequently supported by block-based storage, object-based storage, database services, and/or other virtual storage services. In some situations, storage resources may be able to interact with various computing virtualizations through a series of standardized storage calls that render the storage resources functionally agnostic to the structural and functional details of the block-based storage volumes that they support and the operating systems executing on the virtualizations to which they provide storage availability.

Some virtualized computing environments may store snapshots including software stacks or images to be used by virtualized compute servers of a compute service, such as machine images used for booting the compute servers, or point-in-time snapshots used to recover server state as of a desired point in time, at a storage repository service implemented by the same provider network. In some scenarios, the responsiveness of various types of operations as perceived by clients of the compute service may be impacted negatively due to latencies involved in inter-service data transfers.

Figure 1:
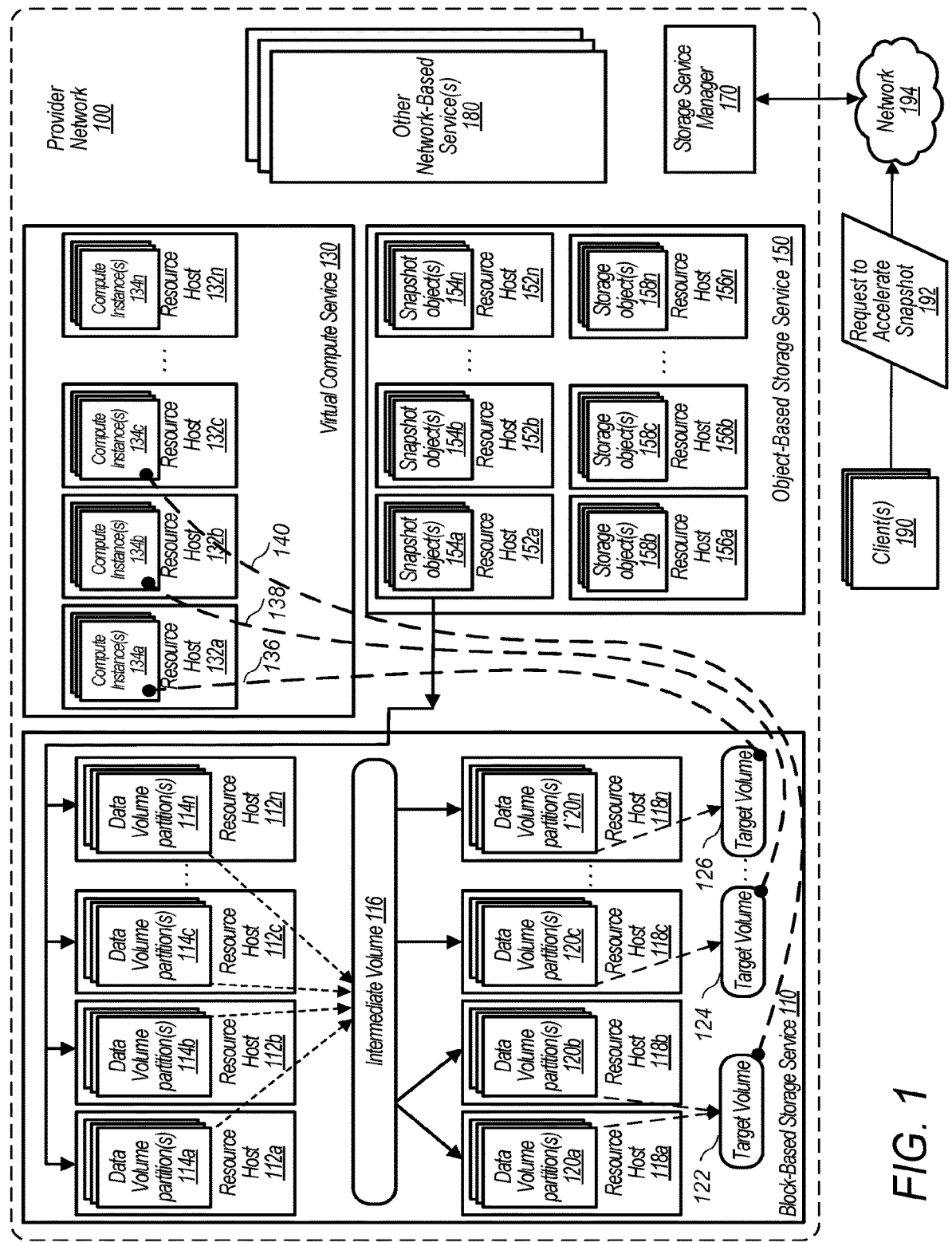
FIG. 1 illustrates a block diagram of a provider network and illustrates target volumes in a first storage service of the provider network being populated with data from an accelerated snapshot, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement an accelerated snapshot for a snapshot stored in a first storage service implemented via a distributed system of a provider network and usable to populate a volume of another storage service implemented via another distributed system of the provider network.

Distributed systems of a provider network may host various resource instances, such as compute resource instance and storage resource instances, for performing or implementing different systems, services, applications and/or functions. Resource instances may be of many different types and may be hosted at one or more resource hosts of a distributed system, such as one of various types of physical or virtualized computing resources, storage resources, or networking resources.

In at least some provider networks, a network-accessible virtual compute service may be established, enabling clients to utilize virtualized compute servers (which may also be referred to as "compute instances" herein) set up on their behalf at resource hosts managed by the provider network operator. A given resource host may implement, at a given point in time, one or more compute instances, as well as a virtualization management software stack (e.g., a hypervisor and/or one or more administrative operating system instances). Accelerated snapshots as described in further detail below may be used in various embodiments to transfer data from one or more data repositories to target volumes (e.g., boot volumes, or other block-level storage volumes) accessible from the compute instances, thus enabling various phases of operating system execution (such as boot sequences) and/or application execution (e.g., database initialization) to be sped up.

According to some embodiments, a block-based storage service of the provider network may enable clients to create or instantiate virtual block storage devices, such as mountable block-level storage volumes. The virtual block storage devices may implement block device programmatic interfaces for I/O, and may enable one or more storage volumes to be programmatically attached to a compute instance to support networked block-level I/O operations (as opposed to, for example, file-level I/O operations) from the compute instance. In some embodiments, for example, a block-based storage service may expose a "CreateVolume" application programmatic interface (API), enabling clients to specify a volume size, as well as various other parameters such as a provisioned performance level to be supported by the block-based storage service (expressed in units such as block I/O operations per second) for a requested volume. An "AttachVolume" API may be supported in such an embodiment to programmatically attach a specified volume to a specified compute instance. After a given volume implemented by the block-based storage service is attached to a compute instance, in some embodiments, the compute instance may interact with the volume just as it would interact with a local drive, e.g., formatting the volume with a file system and/or installing applications on the volume. Thus, the volumes provided by the block storage service may behave analogously to raw unformatted external hard drives from the perspective of the compute instances.

In at least some embodiments, clients of a block-based storage service may be able to generate point-in-time snapshots of their volumes programmatically, e.g., using a "CreateSnapshot" API. The point-in-time snapshot may be stored within a different storage service of the provider network in at least some embodiments, such as a storage repository service that exposes a web-services interface rather than a block device interface. In some embodiments, the storage repository service may be an object-based storage service as opposed to a block-based storage service.

For example, in at least some embodiments, the repository storage service may be configured to store key-value objects, e.g. the repository storage service may be an object-based storage service where each object is simply considered as an unstructured collection of bits identified by a key. As opposed to the block device interfaces implemented by the block-based storage service, in at least some embodiments the repository service may implement a web services API, so that, for example, clients of the repository service may store data directly to, and access data directly from, the repository service without being required to attach or mount any devices, and without necessarily using compute instances of the provider network. In various embodiments, the provider network may support high data durability levels, for either the block-based storage service, the storage repository, or both. Various types of data replication techniques, such as full replication or erasure coding algorithms, may be used to ensure the desired data durability in different embodiments.

In some embodiments, a new volume may be created using an existing snapshot as a data source for the volume. For example, a "CreateVolume" call may specify a source snapshot. In some embodiments, a volume populated with data from an existing snapshot may be attached to a desired compute instance, thus setting the state of the compute instance attached to the volume to a point in time at which the snapshot was generated. In some embodiments, a same snapshot may be used to create volumes for a plurality of compute instances. A number of other APIs to manage volumes and snapshots may be supported by a block-based storage service in various embodiments, such as DetachVolume, DeleteVolume, DescribeVolumes (to obtain configuration information regarding a specified set of volumes), DeleteSnapshot, CopySnapshot, UpdateSnaphsot, and so on. It is noted that in at least in some embodiments, a given snapshot used as a source for a volume may not necessarily represent a single point in time (i.e., not all snapshots need be point-in-time snapshots).

In some embodiments, snapshot objects or other types of objects stored at a storage repository service may be used for boot volumes for compute instances, e.g., to boot up compute instances. Thus, in such embodiments, the software and configuration metadata needed to launch or start up a given compute instance (e.g., an instance that is to run a specified webserver W1 on an operating system O1) may be bundled into a snapshot stored at the repository storage service. Such a snapshot may be used to populate (e.g. instantiate the contents of various blocks of) a bootable volume implemented by a block-based storage service. For example, snapshot data used to populate a volume of a block-based storage service may be used to boot up a compute instance with a desired configuration.

When a compute instance is launched or started for the first time, contents of its boot volume may be obtained from a repository storage service in at least some embodiments. Depending on the properties of the instance (such as the specific operating system and operating system version being used for the instance, the set of operating system services that are to be started up as part of the boot process, and so on), it may take a non-trivial amount of time to retrieve the contents of the boot volume from the repository storage service.

In some embodiments, an accelerated snapshot or other type of accelerated object may reduce an amount of time required to populate a target volume of a block-based storage service with snapshot data or other data, such as data for a boot volume, point-in-time snapshot, test data, etc. In some embodiments, an accelerated snapshot may be implemented using an intermediate volume of a block-based storage service that is not visible outside of the block-based storage service. For example, an intermediate volume may be implemented in the background of a block-based storage service and may not be visible to a client of the block-based storage service or to a compute instance coupled with a target volume of the block-based storage service.

In some embodiments, an accelerated snapshot may include snapshot data stored locally in a block-based storage system on an intermediate volume that has a higher IO capacity than other volumes of the block-based storage service. The locally stored snapshot data may accelerate the snapshot by eliminating the need to retrieve snapshot data from another service of the provider network, e.g. the repository storage service, and may further accelerate the snapshot by storing the snapshot data in an intermediate volume with superior IO capacity as compared to one or more target volumes for the snapshot.

In some embodiments, an intermediate volume that implements an accelerated snapshot may be instantiated when the accelerated snapshot is created, when an existing snapshot is selected for acceleration, or in response to a request to populate a target volume with data from an accelerated snapshot. In some embodiments, an intermediate volume of an accelerated snapshot may be implemented on resource hosts of a block-based storage service that comprise equal or higher capacity hardware than other resource hosts of the block-based storage service. For example, in some embodiments, a block-based storage service may offer different performance levels for different types or classes of volumes, wherein volumes having different performance levels are implemented on different resource hosts having different respective performance capacities. Thus, in such embodiments, an intermediate volume used to implement an accelerated snapshot may be implemented on one or more resource hosts comprising hardware with a performance capacity equal to or greater than the highest performance level offered by the block-based storage service.

Additionally, in some embodiments, an intermediate volume used to implement an accelerated snapshot may be configured with a high level of IO capacity reserved for reading data from a snapshot stored in a repository storage service and for providing stored snapshot data to target volumes. For example, in contrast to the target volume, an intermediate volume may have less IO capacity of the underlying hardware implementing the intermediate volume reserved for servicing IO requests from clients and may instead dedicate more of the IO capacity of the underlying hardware implementing the intermediate volume to populating the intermediate volume with snapshot data and to providing stored snapshot data to one or more target volumes to populate the one or more target volumes. In some embodiments, an intermediate volume may be implemented on shared resource host hardware that also implements other volume partitions, e.g. target volume partitions and/or intermediate volume partitions for other intermediate volumes. In such embodiments, a resource manager may allocate only a portion of the IO capacity of the underlying resource host to each volume or volume partition implemented on the resource host. For target volumes, e.g. volumes that receive read and write requests from clients, a portion of the target volume's allocated IO capacity may be reserved for foreground operations, e.g. responding to read and write requests, and another portion of the target volume's allocated IO capacity may be reserved for background operations, such as receiving snapshot data, performing software updates, performing replication, etc. In contrast, an intermediate volume may not be exposed to clients outside of the block-based storage service. Thus a greater portion of the intermediate volume's allocated IO capacity may be dedicated to populating the intermediate volume with snapshot data and to providing snapshot data to target volumes.

Moreover, in some embodiments, because an intermediate volume is not visible outside of the block-based storage service, certain constraints that are applied to standard volumes allocated to clients, such as target volumes, may be relaxed for intermediate volumes. For example, a largest class of volumes offered by a block-based storage service may be limited to a certain number of volume partitions, such as 16 volume partitions. However, in the case of intermediate volumes, such restrictions may be relaxed. For example, in some embodiments, an intermediate volume may comprise more partitions than are available for standard volumes allocated to clients, e.g. target volumes. For example in some embodiments, an intermediate volume may include 32, 64 or some other number of partitions. In some embodiments, an intermediate volume may be highly parallelized wherein a snapshot is divided into 100s or 1,000s of shards, wherein each shard is stored in a separate partition of an intermediate volume used to accelerate the snapshot.

In some embodiments, each partition of an intermediate volume storing a shard of a snapshot object may be implemented using a different resource host of a block-based storage service. Thus, IO load on one partition may not impact IO capacity of another partition. Also, because partitions are implemented across multiple resource hosts, the respective capacities of each of the resource hosts may be cumulatively used to populate the intermediate volume and to populate target volumes from the intermediate volume.

Moreover, in some embodiments, multiple target volumes may be populated from the same intermediate volume of an accelerated snapshot. For example, in the case of a non-accelerated snapshot, each target volume to be populated from the snapshot may acquire the snapshot data from another storage service that stores the snapshot, such as an object-based storage service or other repository storage service. In some embodiments, the other storage service may be located at a remote network location and may utilize a less efficient communication protocol than is used for communications between volumes within a same block-based storage service. In the case of the non-accelerated snapshot, each volume to be populated may retrieve the snapshot data from the other storage service and incur the delays associated with transferring the snapshot data between services. However, in the case of an accelerated snapshot, once snapshot data is populated into an intermediate volume, the intermediate volume may be used to populate multiple target volumes within the block-based storage service without repeating the steps of retrieving the snapshot data from the original snapshot stored in the other storage service or writing the snapshot data from the other storage service to the intermediate volume. Thus, the costs (in terms of time and network resources) of transferring snapshot data from a repository storage service to a block-based storage service may be paid once and may enable multiple target volumes to subsequently be populated with the snapshot data without having to repeat paying the costs of transferring the snapshot data from the repository storage service to the block-based storage service.

Also, in some embodiments, once an intermediate volume is populated with snapshot data, reads directed at target volumes being populated with snapshot data from the populated intermediate volume may be locally serviced by either the target volume, or if the requested data has not yet been populated to the target volume, the intermediate volume. Since the target volume and the intermediate volume are both stored in the same block-based storage service, any delays caused by a get fault, e.g. a get directed at a target volume requesting data not yet populated to the target volume, may be serviced by the intermediate volume with a minimal delay. For example, in some embodiments, a client may not be aware that there was a "get fault" and that the requested data was read from the intermediate volume instead of the target volume. In contrast, for a target volume being populated from a snapshot stored in a repositoy storage service without using an intermediate volume, a "get fault" may require the requested data to be read from the snapshot stored in the other storage service, which may result in high latencies and/or other delays.

In some embodiments, in addition to or instead of relaxing IO requirements for an intermediate volume, a provider network may relax a throughput constraint for an intermediate volume of an accelerated snapshot. For example, some provider networks may throttle network communications for volumes of a block-based storage service, but may allow for faster network communications for an intermediate volume of an accelerated snapshot. For example, a standard volume may have a throughput limit of 500 gigabytes per second, whereas an intermediate volume of an accelerated snapshot may have a higher throughput limit, such as 1 gigabyte/sec.

Also, in some embodiments, a snapshot may be stored in a repository storage service in a compressed format, wherein to populate a volume in a block-based storage service from the snapshot stored in the repository storage service, the snapshot may be decompressed. The process of decompressing the snapshot may further delay populating a volume with data from the snapshot. However, for accelerated snapshots, this delay may be incurred a single time when the snapshot is used to populate the intermediate volume, but may be avoided when target volumes are then populated from the intermediate volume. For example, the snapshot data may be stored in the intermediate volume in an un-compressed format.

In some embodiments, a provider network comprises a plurality of resource hosts configured to implement a block-based storage service, one or more computing devices configured to implement an object-based storage service, wherein the object-based storage service stores one or more snapshots usable to populate one or more storage volumes of the block-based storage service, and a storage service manager. The storage service manager is configured to receive a request to accelerate storage volume population from a particular one of the one or more snapshots of the object-based storage service and, in response to the request, implement an intermediate storage volume on one or more of the resource hosts of the block-based storage service, wherein the intermediate storage volume has a greater input/output (IO) capacity than one or more target volumes for the particular snapshot, populate the intermediate volume with data read from the particular snapshot, and populate the one or more target volumes with data read from the intermediate volume. Additionally, in response to receiving a read request directed to one of the one or more target volumes, the block-based storage service is configured to read requested data for the read request from the target volume, for data that has been populated to the target volume, and read requested data for the read request from the intermediate volume, for data that has not yet been populated to the target volume.

In some embodiments, a method comprises receiving a request to accelerate volume population of one or more target volumes of a block-based storage service from a snapshot stored in a storage repository service, implementing an intermediate volume on one or more resource hosts of the block-based storage service, wherein the intermediate volume has a greater input/output (IO) capacity than the one or more target volumes for the snapshot, populating the intermediate volume with data read from the snapshot, and populating the one or more target volumes with data read from the intermediate volume.

In some embodiments, a non-transitory computer readable medium stores program instructions, that when executed by one or more processors, cause the one or more processors to implement an intermediate volume on one or more resource hosts of a block-based storage service, in response to receiving a request to accelerate volume population to the block-based storage service from a snapshot stored in a another storage service, populate the intermediate volume with data read from the snapshot stored in the other storage service, and populate one or more target volumes implemented on one or more resource hosts of the block-based storage service with data read from the intermediate volume, wherein the intermediate volume has a greater input/output (IO) capacity for receiving data from the snapshot than the one or more target volumes.

FIG. 1 illustrates a block diagram of a provider network and illustrates target volumes in a first storage service of the provider network being populated with data from an accelerated snapshot, according to some embodiments.

Provider network 100 may be set up by an entity such as a company or a public sector organization to provide one or more services (such as various types of cloud-based computing or storage) accessible via the Internet and/or other networks to clients 190. Provider network 100 may include numerous data centers (such as the data centers and network spines described in regard to FIG. 7, below) hosting various pools of resource hosts, such as collections of physical and/or virtualized computer servers, storage devices, networking equipment and the like (e.g., computing system 1400 described below with regard to FIG. 14), needed to implement and distribute the infrastructure and services offered by the provider network 100. In some embodiments, provider network 100 may provide computing resources, such as virtual compute service 130, storage services, such as block-based storage service 110 and object-based storage service 150 (which may include various storage types such as object/key-value based data stores or various types of database systems), and/or any other type of network-based services 180. Clients 190 may access these various services offered by provider network 100 via network 194. Likewise network-based services may themselves communicate and/or make use of one another to provide different services. For example, computing resources offered to clients 190 in units called "instances," such as virtual or physical compute instances or storage instances, may make use of other resources, such as target data volumes 122, 124 through 126, providing virtual block storage for the compute instances 134a, 134b, and 134c via virtual attachments 136, 138, and 140.

As noted above, virtual compute service 130 may offer various compute instances to clients 190. A virtual compute instance may, for example, be implemented on one or more resource hosts 132 that comprise one or more servers with a specified computational capacity (which may be specified by indicating the type and number of CPUs, the main memory size, and so on) and a specified sofware stack (e.g., a particular version of an operating system, which may in turn run on top of a hypervisor). A number of different types of computing devices may be used singly or in combination to implement the compute instances of virtual compute service 130 in different embodiments, including special purpose computer servers, storage devices, network devices and the like. In some embodiments instance clients 190 or any other user may be configured (and/or authorized) to direct network traffic to a compute instance. In various embodiments, compute instances may attach or map to one or more data volumes, such as target volumes 122, 124, and 126, provided by block-based storage service 110 in order to obtain persistent block-based storage for performing various operations.

Compute instances may operate or implement a variety of different platforms, such as general purpose operating systems, application server instances, Java™ virtual machines (JVMs), special-purpose operating systems, platforms that support various interpreted or compiled programming languages such as Ruby, Per, Python, C, C++ and the like, or high-performance computing platforms) suitable for performing client applications, without for example requiring the client 190 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 100 may also implement block-based storage service 110 for providing storage resources and performing storage operations. Block-based storage service 110 is a storage system, composed of a pool of multiple independent resource hosts 112a, 112b, 112c through 112n and 118a, 118b, 118C through 118n (e.g., server block data storage systems), which provide block level storage for storing one or more sets of data volumes, such as data volume partition(s) 114a, 114b, 114c through 114n, and data volume partitions 120a, 120b, 120c through 120n. Data volumes 122, 124, and 126 (comprising data volume partitions 120a-120n) may be mapped to particular clients, providing virtual block-based storage (e.g., hard disk storage or other persistent storage) as a contiguous set of logical blocks. In some embodiments, a data volume 122, 124, or 126 may be divided up into multiple data chunks (including one or more data blocks) for performing other block storage operations, such as snapshot operations or replication operations. A volume snapshot of a data volume 122, 124, or 126 may be a fixed point-in-time representation of the state of the data volume 122, 124, or 126. In some embodiments, volume snapshots may be stored remotely from a resource host 118 maintaining a data volume, such as in another storage service, such as object-based storage service 150. Snapshot operations may be performed to send, copy, and/or otherwise preserve the snapshot of a given data volume in another storage location, such as a remote snapshot data store in other storage service, such as object-based storage service 150.

In some embodiments, an object-based storage service, such as object-based storage service 150, may include a plurality of resource hosts that store snapshot objects and/or other storage object. For example, object-based storage service 150 includes resource hosts 152a and 152b through 152n storing snapshot objects 154a and 154b through 154n. Additionally, object-based storage service 150 includes resource hosts 156a and 156b through 156n storing storage objects 158a and 158b through 158n. For ease of illustration, snapshot objects 154 and storage objects 158 are illustrated as being stored on different resource hosts of object-based storage service 150. However, in some embodiments a same resource host of an object-based storage service, such as a resource host 152 of object-based storage service 150 may store both storage objects and snapshot objects, for example from a snapshot taken of a volume stored in block-based storage service 110 or from a machine image used by a target volume of a block-based storage service to boot a compute instance, such as one of compute instances 134.

In some embodiments, volume snapshots of various data volumes 120 may be stored as snapshot objects for a particular data volume 120. In addition to object-based storage service 150, provider network 100 may implement other network-based services 180, which may include various different types of analytical, computational, storage, or other network-based system allowing clients 190, as well as other services of provider network 100 (e.g., block-based storage service 110, virtual compute service 130 and/or object-based storage service 150) to perform or request various tasks.

Clients 190 may encompass any type of client configurable to submit requests to network provider 100. For example, a given client 190 may include a suitable version of a web browser, or may include a plug-in module or other type of code module configured to execute as an extension to or within an execution environment provided by a web browser. Alternatively, a client 190 may encompass an application such as a database application (or user interface thereof), a media application, an office application or any other application that may make use of compute instances 134, a data volume 120 or other network-based service in provider network 100 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 190 may be configured to generate network-based services requests according to a Representational State Transfer (REST)-style network-based services architecture, a document- or message-based network-based services architecture, or another suitable network-based services architecture. In some embodiments, a client 190 (e.g., a computational client) may be configured to provide access to a compute instance 134 or data volume 120 in a manner that is transparent to applications implemented on the client 190 utilizing computational resources provided by the compute instance 134 or block storage provided by the data volume 120.

Clients 190 may convey network-based services requests to provider network 100 via external network 194. In various embodiments, external network 194 may encompass any suitable combination of networking hardware and protocols necessary to establish network-based communications between clients 190 and provider network 100. For example, a network 194 may generally encompass the various telecommunications networks and service providers that collectively implement the Internet. A network 194 may also include private networks such as local area networks (LANs) or wide area networks (WANs) as well as public or private wireless networks. For example, both a given client 190 and provider network 100 may be respectively provisioned within enterprises having their own internal networks. In such an embodiment, a network 194 may include the hardware (e.g., modems, routers, switches, load balancers, proxy servers, etc.) and software (e.g., protocol stacks, accounting software, firewall/security software, etc.) necessary to establish a networking link between given client 190 and the Internet as well as between the Internet and provider network 100. It is noted that in some embodiments, clients 190 may communicate with provider network 100 using a private network rather than the public Internet.

In some embodiments, a client, such as client 190, may submit a request to accelerate one or more snapshots stored in a storage repository service, such as request 192 to accelerate snapshot object 154a stored in object-based storage service 150. In response to receiving a request to accelerate a snapshot, such as request 192, a storage manager of a provider network, such as storage manager 170, may cause the requested snapshot(s) to be accelerated. In order to accelerate the one or more snapshots, the storage manager may cause an intermediate volume to be implemented in a block-based storage service, such as block-based storage service 116. For example, storage service manager 170 may cause intermediate volume 116 to be implemented on resource hosts 112a through 112n wherein intermediate volume 116 includes volume partitions 114a through 114n, wherein different ones of the volume partitions are implemented via different ones of the resource hosts 112a through 112n. In some embodiments, a storage service manager, may interact with a placement manager or other manager of block-based storage service 110 to cause intermediate volume 116 to be implemented. Also, in some embodiments, storage service manager 170 may be included as part of a resource manager for block-based storage service 110.

In some embodiments, a storage service manager, such as storage service manager 170, may cause snapshot data stored in the storage repository service to be read from the storage repository service and used to populate the intermediate volume. For example, storage service manager 170 may cause data to be read from resource host 152a for snapshot object 154a. The storage service manager 170 may cause blocks or chunks of the snapshot data to be stored in respective ones of resource hosts 112a through 112n on respective data volume partitions 114a through 114n, wherein the respective volume partitions make up intermediate volume 116.

In some embodiments, resource hosts used to implement an intermediate volume, such as intermediate volume 116, may include hardware with a greater IO capacity than hardware of other resource hosts of a block-based storage service. For example, resource hosts 112a through 112n may be implemented on hardware that has a higher IO capacity than hardware that implements resource hosts 118a through 118n. In some embodiments, a block-based storage service may implement different classes of volumes, wherein the different classes of volumes are implemented on resource hosts having different IO capacities. In such embodiments, an intermediate volume, such intermediate volume 116, may be implemented on hardware corresponding to a volume class with more IO capacity than other ones of the volume classes offered by the block-based storage service.

In some embodiments, a block-based storage service may allocate IO capacity to data volume partition according to which volume class the data volume partitions belong to. For example, in some embodiments, resource host 112a may implement multiple data volume partitions 114a and some of the data volume partitions 114a may be allocated more IO capacity than other ones of the data partitions 114a. Also, in some embodiments, a block-based storage service may allocate IO capacity to volume partitions that are exposed outside of the block-based storage service according to a standardized set of volume classes. However, in the case of an intermediate volume that is not exposed outside of the block-based storage service, volume partitions may be allocated more or different amounts of IO capacity than are allocated according to the standardized volume classes. For example, a data volume partition 114a used to implement intermediate volume 116 may be allocated more IO capacity than another data volume partition 114a that is part of a volume exposed outside of block-based storage service 110.

Additionally, in some embodiments, a volume exposed outside of a block-based storage service may be configured with a portion of the IO capacity of a volume partition of the volume being reserved for foreground operations, such as responding to read and write requests, and another portion of the IO capacity of the volume partition being reserved for background operations such as replication, software updates, etc. However, in the case of volume partitions used to implement an intermediate volume, such as intermediate volume 116, a larger portion of the volume partition's IO capacity may be dedicated to receiving snapshot data from a snapshot stored in a storage repository service and to reading snapshot data to be used to populate target volumes. This is because less or none of the volume partition's IO capacity is reserved for foreground operations (since the volume partition is not visible outside of the block-based storage service it does not service reads and writes directly from clients or compute instances).

Moreover, an intermediate volume may be implemented using more volume partitions than a volume accessible outside of the block-based storage service. For example a highest volume class may limit a number of partitions to a particular number of partitions (e.g. 16 partitions). However, an intermediate volume, such as intermediate volume 116, may not be limited to follow the restrictions placed on standard volumes, even standard volumes of the highest volume class offered by the block-based storage service. For example, in some embodiments, an intermediate volume may include more volume partitions than is allowed for standard volumes (e.g. 32, or 64 partitions). In some embodiments, as discussed in more detail in regard to FIG. 3, an intermediate volume may be highly parallelized and implemented using significantly more, such as orders of magnitude more, volume partitions than a standard volume. For example in some embodiments, an intermediate volume may comprise 100s or 1,000s of volume partition.

In some embodiments, because an intermediate volume is implemented on higher capacity hardware, it is allocated a larger portion of IO capacity of the hardware that implements its volume partitions, and/or because the intermediate volume includes more volume partitions implemented on more resource hosts, the intermediate volume may more quickly be populated with snapshot data than would be the case for a standard volume. Also, for similar reasons and additionally because the intermediate volume is included in a same block-based storage service, the intermediate volume may more quickly populate target volumes in the block-based storage service than would be the case if each of the target volumes were being populated with snapshot data stored in a storage repository service, such as object based-storage service 150. Also, an intermediate volume, such as intermediate volume 116, may be populated with snapshot data a single time for a current snapshot version and may be used to populate multiple target volumes with the current snapshot version without repeating the process of acquiring the snapshot data from the storage repository service where the snapshot was originally stored.

For example, data volume partitions 120a and 120b of target volume 122, data volume partition 120c of target volume 124 and data volume partition 120n of target volume 126 may be populated with snapshot data from intermediate volume 116 without having to repeat the acquisition of the snapshot data from resource host 152a of object-based storage service 150. Also, in some embodiments, multiple target volumes, such as target volumes 122, 124, and 126 may be populated in parallel with snapshot data from an intermediate volume, such as intermediate volume 116.

In some embodiments, target volumes may be attached to compute instances, for example to boot the compute instances from a snapshot that includes a boot file, machine image, etc. For example, target volume 122 may be attached, via attachment 136, to compute instance 134a and used to boot compute instance 143a using a machine image included in snapshot data populated to target volume 122. In a similar manner, target volume 124 may be attached to compute instance 134b via attachment 138 and target volume 126 may be attached to compute instance 134c via attachment 140. As discussed in more detail below in regard to FIG. 9, in some embodiments a target volume may be attached to a compute instance or otherwise put in service when the target volume is implemented and before the target volume is fully populated. In such embodiments, all writes may be performed at the target volume and read requests may be responded to using data read from the target volume if already populated to the target volume or data read from an intermediate volume for snapshot data that has not yet been populated to the target volume. However, because the intermediate volume and the target volume are included in the same block-based storage service (and may be located in the same availability zone, data center, or network spine), a delay caused by reading requested data from the intermediate volume instead of the target volume may be small and not noticed by a client or compute instance attached to the target volume. For example, the delay may be much shorter than would be the case if the requested data not yet populated to the target volume was instead read from a snapshot object stored in a storage repository service, such as object-based storage service 150.

Figure 2:
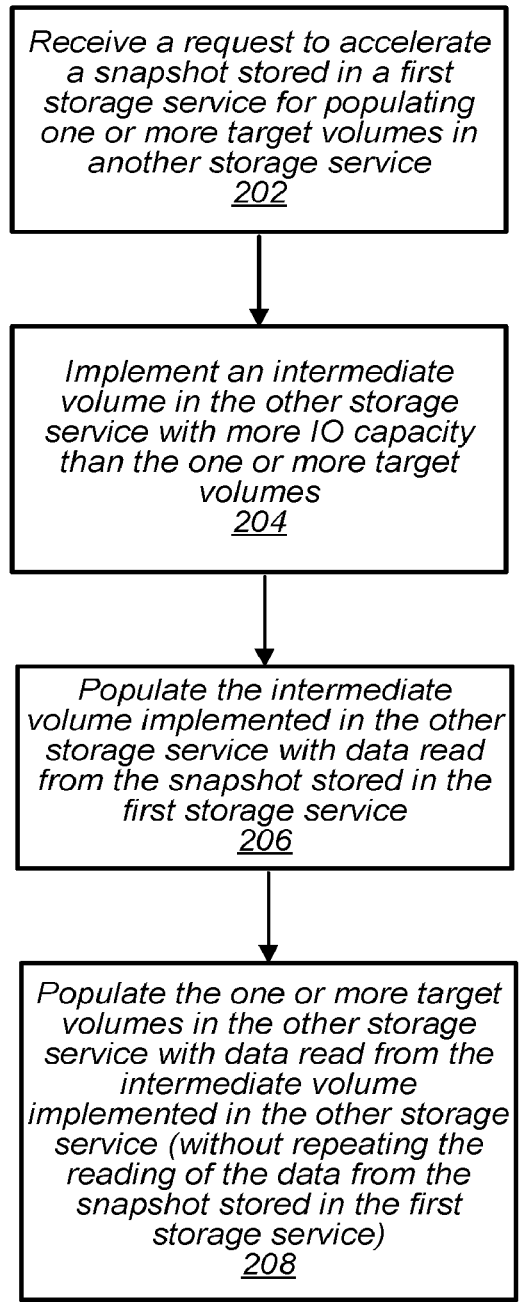
FIG. 2 illustrates a process of populating target volumes using an accelerated snapshot, according to some embodiments.

FIG. 2 illustrates a process of populating target volumes using an accelerated snapshot, according to some embodiments. For example, storage service manager 170 may cause the actions described in FIG. 2 to be executed in response to receiving a request to accelerate a snapshot, such as request 192.

At 202 the storage service manager receives a request to accelerate a snapshot stored in a first storage service, such as a storage repository service, such as object-based storage service 150. The accelerated snapshot is to be accelerated to populate one or more target volumes in another service of the provider network, such as block-based storage service 110.

In response to receiving the request or in response to a target volume being implemented, the storage service manager causes an intermediate volume to be implemented in the other storage service, such as the block-based storage service 110. The intermediate volume may have a greater or equal IO capacity as other volumes of the other storage service, such as the target volumes. For example, in some embodiments an intermediate volume may be implemented for an accelerated snapshot in direct response to a request to accelerate the snapshot. However, in other embodiments, a request to accelerate a snapshot may cause a storage service manager to implement an intermediate volume to accelerate the snapshot on-demand, such as at a point in time at which a target volume is to be populated from the accelerated snapshot. Thus, in some embodiments, some time may pass between when a request to accelerate a snapshot is received and when the snapshot is accelerated via implementing an intermediate volume in a destination storage service.

At 206, the implemented intermediate volume is populated with data read from the snapshot stored in the first storage service, such as the repository storage service, such as object-based storage service 150.

At 208, one or more target volumes in the other storage service, such as the block-based storage service 110, are populated with snapshot data read from the intermediate volume. In some embodiments, populating multiple target volumes may be performed in parallel from a single or multiple intermediate volumes that accelerate a snapshot. The populating of the target volumes may be performed using data stored at the intermediate volume without repeating the process of acquiring the snapshot data from the first storage service, such as the storage repository service, such as object-based storage service 150.

Figure 3:
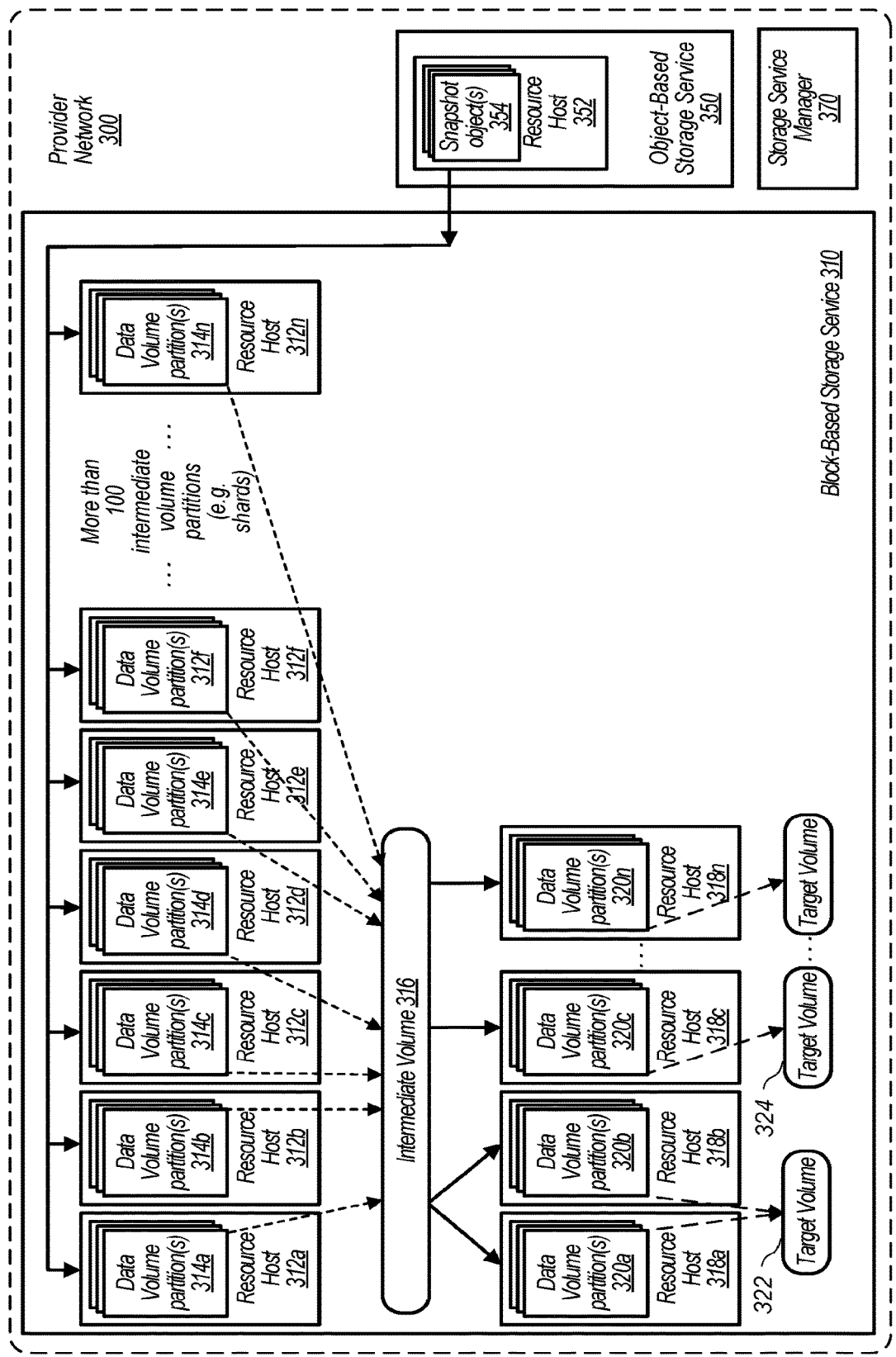
FIG. 3 illustrates a block diagram of a provider network and illustrates target volumes in a first storage service of the provider network being populated with data from an accelerated snapshot that includes a highly parallelized intermediate volume, according to some embodiments.

FIG. 3 illustrates a block diagram of a provider network and illustrates target volumes in a first storage service of the provider network being populated with data from an accelerated snapshot that includes a highly parallelized intermediate volume, according to some embodiments.

As previously discussed, in some embodiments, an intermediate volume used to accelerate a snapshot may be highly parallelized and include 100s or 1,000s of partitions that each store a shard of a snapshot. Each of the volume partitions may be implemented on a different resource host of a block-based storage system. Thus, the intermediate volume may have an IO capacity that is based on the capacity of 100s or 1,000s of resource hosts, as compared to much fewer resource hosts that may implement a standard volume, such as one of the target volumes.

For example, FIG. 3 illustrates provider network 300 that includes object-based storage service 350 that includes resource host 352 storing snapshot object 354. Provider network 300 also includes resource hosts 312a, 312b, 312c, 312d, 312e, and 312f through 312n, wherein n may be 100s or 1,000s of resource hosts. The resource hosts 312a-n implement data volume partitions of intermediate volume 316, wherein the data volume partitions include data volume partitions 314a, 314b, 314c, 314d, 314e, and 314f through 314n, wherein n may be 100s or 1,000s of volume partitions.

As can be seen in FIG. 3, in response to snapshot object 354 being accelerated, storage service manager 370 may implement intermediate volume 316 and cause shards of snapshot object 354 to be stored in respective ones of volume partitions 314a through 314n implemented on resource hosts 312a through 312n.

Also, any number of target volumes may be populated with snapshot data from intermediate volume 316, concurrently or at different times. For example, target volumes 322 and 324 are populated with snapshot data from intermediate volume 316. The population of a target volume may include snapshot data being read from an intermediate volume and being stored in respective volume partitions of the target volumes, such as volume partitions 320a and 320b implemented on resource hosts 318a and 318b that make up target volume 322. Also, snapshot data from intermediate volume 316 may be concurrently read and stored to volume partition 320c implemented on resource host 318c that makes up target volume 324 and concurrently read and stored to volume partition 320n implemented on resource host 318n, wherein n may be any number such as 100s or 1,000s of volume partitions of target volumes or 100s or 1,000s of target volumes.

Figure 4:
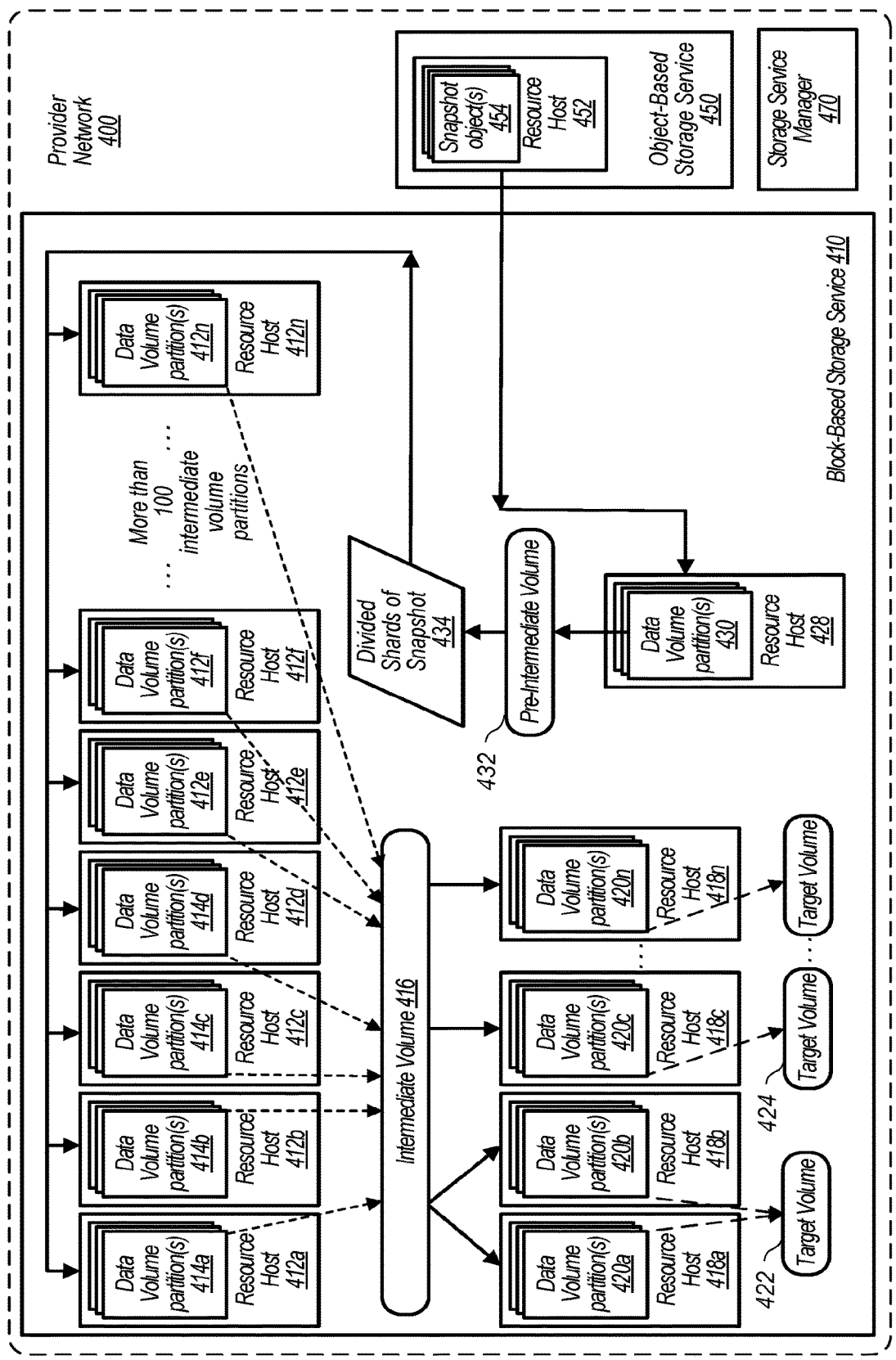
FIG. 4 illustrates a block diagram of a provider network and illustrates target volumes in a first storage service of the provider network being populated with data from an accelerated snapshot that includes a highly parallelized intermediate volume and a pre-intermediate volume, according to some embodiments.

FIG. 4 illustrates a block diagram of a provider network and illustrates target volumes in a first storage service of the provider network being populated with data from an accelerated snapshot that includes a highly parallelized intermediate volume and a pre-intermediate volume, according to some embodiments.

In some embodiments, a storage service manager may cause a pre-intermediate volume to be implemented in a block-based storage service for a snapshot that is being accelerated. The snapshot may be initially stored to the pre-intermediate volume, wherein the snapshot is then divided into shards within the block-based storage service and wherein the shards are then stored to volume partitions of an intermediate volume in a similar manner as described above for FIG. 3.

For example, FIG. 4 illustrates provider network 400 that includes object-based storage service 450 that includes resource host 452 storing snapshot object 454. Provider network 400 also includes resource hosts 412a, 412b, 412c, 412d, 412e, and 412f through 412n, wherein n may be 100s or 1,000s of resource hosts. The resource hosts 412a-n implement data volume partitions of intermediate volume 416, wherein the data volume partitions include data volume partitions 414a, 414b, 414c, 414d, 414e, and 414f through 414n, wherein n may be 100s or 1,000s of volume partitions. Also, block-based storage service 410 includes resource host 428 that implements data volume partitions 430 that make up pre-intermediate volume 432.

As can be seen in FIG. 4, in response to snapshot object 454 being accelerated, storage service manager 470 may implement pre-intermediate volume 432 and intermediate volume 416. Also, the storage service manager 470 may cause snapshot object 454 to be stored at pre-intermediate volume 432 and cause shards 434 of divided snapshot object 454 to be stored in respective ones of volume partitions 414a through 414n implemented on resource hosts 412a through 412n.

Also, any number of target volumes may be populated with snapshot data from intermediate volume 416, concurrently or at different times. For example, target volumes 422 and 424 are populated with snapshot data from intermediate volume 416. In some embodiments, pre-intermediate 432 made up of volume partitions 430 may be released from resource host 428 once intermediate volume 416 is populated and may not be persisted while target volumes 422, 424, etc. are being populated from intermediate volume 416. The population of a target volume may include snapshot data being read from intermediate volume 416 and being stored in respective volume partitions of the target volumes, such as volume partitions 420a and 420b implemented on resource hosts 418a and 418b that make up target volume 422. Also, snapshot data from intermediate volume 416 may be concurrently read and stored to volume partition 420c implemented on resource host 418c that makes up target volume 424 and concurrently read and stored to volume partition 420n implemented on resource host 418n, wherein n may be any number such as 100s or 1,000s of volume partitions of target volumes or 100s or 1,000s of target volumes.

Figure 5:
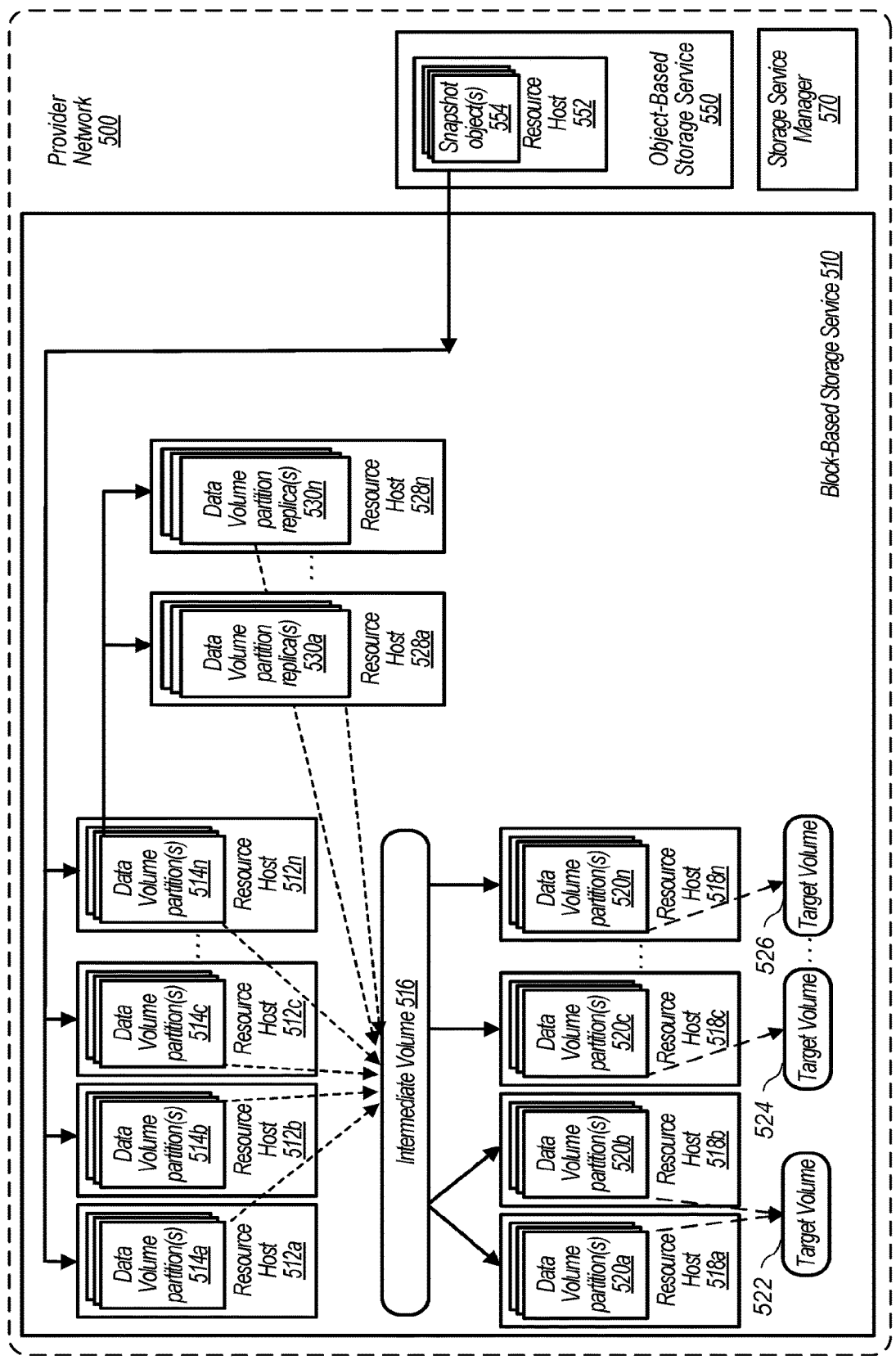
FIG. 5 illustrates a block diagram of a provider network and illustrates a partition of an intermediate volume of an accelerated snapshot being replicated in response to an IO load for the partition exceeding a threshold, according to some embodiments.

FIG. 5 illustrates a block diagram of a provider network and illustrates a partition of an intermediate volume of an accelerated snapshot being replicated in response to an IO load for the partition exceeding a threshold, according to some embodiments.

In some embodiments, a storage service manager may scale up or down a number of volume partitions storing a shard or block of an accelerated snapshot.

For example, FIG. 5 illustrates provider network 500 that includes object-based storage service 550 that includes resource host 552 storing snapshot object 554. Provider network 500 also includes resource hosts 512a, 512b, and 512c through 512n. The resource hosts 512a-n implement data volume partitions of intermediate volume 516, wherein the data volume partitions include data volume partitions 514a, 514b, and 514c through 514n. Also, block-based storage service 510 includes resource hosts 528a through 528n that implement data volume partitions 530a through 530n that store replicas of data volume partition 514n of intermediate volume 516.

As can be seen in FIG. 5, in response to snapshot object 554 being accelerated, storage service manager 570 may implement intermediate volume 516. Also, the storage service manager 570 may cause snapshot object 554 to be stored in respective ones of volume partitions 514a through 514n implemented on resource hosts 512a through 512n. Additionally, in response to an IO load for any one of volume partitions 514a-514n exceeding a threshold IO load, the storage service manager 570, may cause one or more replicas of the hot volume partitions to be created and may further cause the load to be balanced across the original volume partition and the one or more replicas of the volume partition. For example, storage service manager 570 may cause data volume partition 514a to be replicated as data volume partition replicas 530a through 530n stored on resource hosts 528a through 528n.

Also, any number of target volumes may be populated with snapshot data from intermediate volume 516 (that includes partition replicas 530a through 530n), concurrently or at different times. For example, target volumes 522, 524, and 526 are populated with snapshot data from intermediate volume 516. The population of a target volume may include snapshot data being read from intermediate volume 516 and being stored in respective volume partitions of the target volumes, such as volume partitions 520a and 520b implemented on resource hosts 518a and 518b that make up target volume 522. Also, snapshot data from intermediate volume 516 may be concurrently read and stored to volume partition 520c implemented on resource host 518c that makes up target volume 524 and concurrently read and stored to volume partition 520n implemented on resource host 518n that makes up volume 526.

Figure 6:
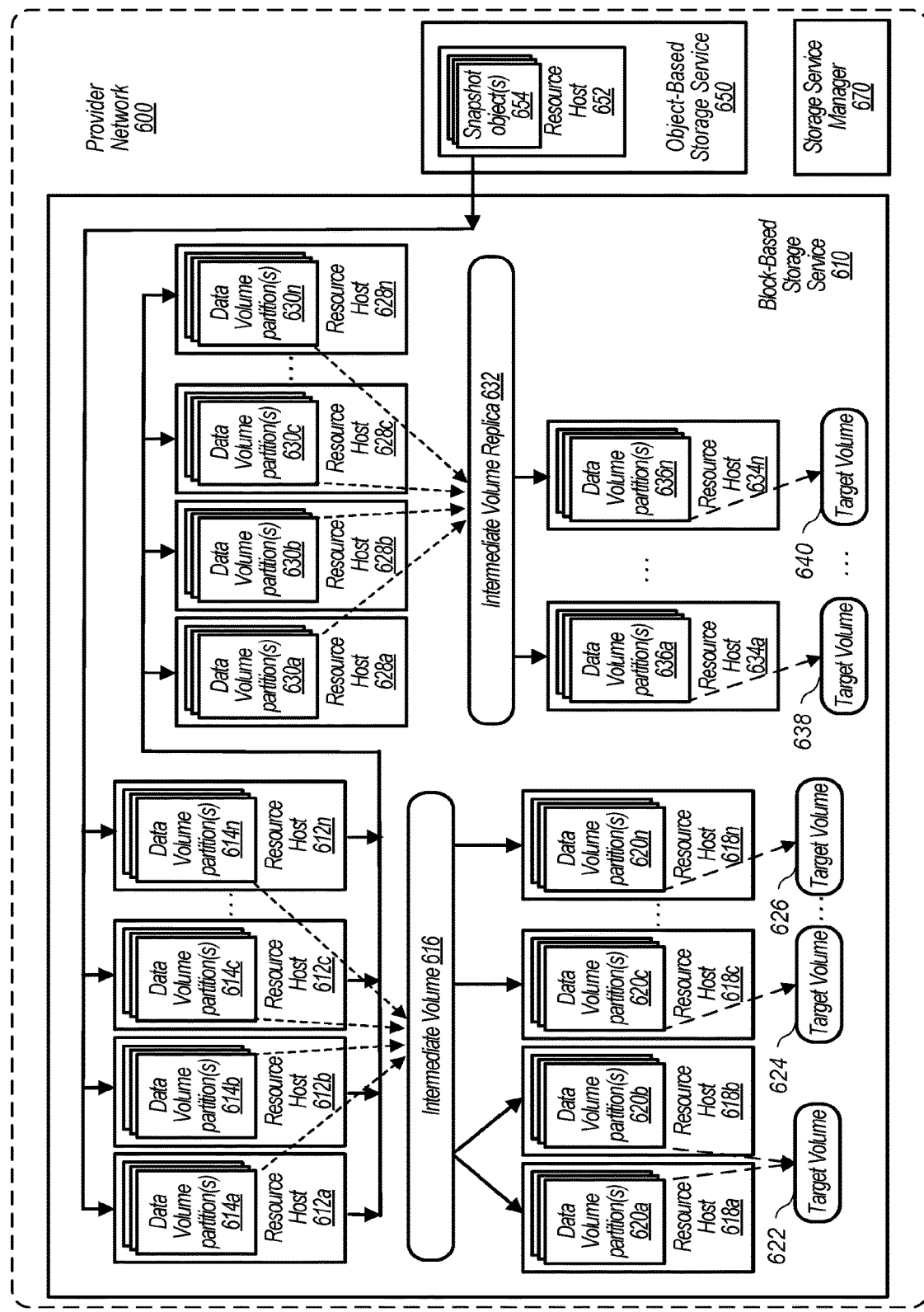
FIG. 6 illustrates a block diagram of a provider network and illustrates an intermediate volume of an accelerated snapshot being replicated in response to an IO load for the intermediate volume exceeding a threshold, according to some embodiments.

FIG. 6 illustrates a block diagram of a provider network and illustrates an intermediate volume of an accelerated snapshot being replicated in response to an IO load for the intermediate volume exceeding a threshold, according to some embodiments.

In some embodiments, a storage service manager may scale up or down a number of intermediate volumes in addition to or in place of scaling up or down a number of volume partitions used to implement an intermediate volume In some embodiments, different replicas of an intermediate volume may be implemented on resource hosts in different locations or portions of a provider network. For example, in some embodiments, different replicas of an intermediate volume may be implemented in different availability zones, data centers, or network spines of a provider network. In some embodiments a storage service manager may implement additional intermediate volume replicas in different portions of a provider network, such as different availability zones, data centers, or network spines, in response to a quantity of target volumes or a load from target volumes in additional locations, such as availability zones, data centers, or network spines exceeding a threshold quantity or IO loa.

For example, FIG. 6 illustrates provider network 600 that includes object-based storage service 650 that includes resource host 652 storing snapshot object 654. Provider network 600 also includes resource hosts 612a, 612b, and 612c through 612n. The resource hosts 612a-n implement data volume partitions of intermediate volume 616, wherein the data volume partitions include data volume partitions 614a, 614b, and 614c through 614n. Also, block-based storage service 610 includes resource host 628a, 628b, and 628c through 628n. The resource hosts 628a-n implement data volume partitions of intermediate volume replica 632, wherein the data volume partitions include data volume partitions 630a, 630b, and 630c through 630n. In some embodiments, resource hosts 612a-612n that implement intermediate volume 616 and resource hosts 628a-628n that implement intermediate volume replica 632 may be located in different availability zones, data centers, or network spines of provider network 600.

As can be seen in FIG. 6, in response to snapshot object 654 being accelerated, storage service manager 670 may implement intermediate volume 616 and intermediate volume replica 632. Also, the storage service manager 670 may cause snapshot object 664 to be stored in respective ones of volume partitions 614a through 614n implemented on resource hosts 612a through 612n and respective ones of volume partitions 630a through 630n implemented on resource hosts 628a through 628n. In some embodiments, storage service manager 670 may implement intermediate volume 632 in response to an IO load for intermediate volume 616 exceeding a threshold IO load and cause the IO load to be balanced across the original intermediate volume 616 and the intermediate volume replica 632. In some embodiments, a storage service manager 670 may cause intermediate volume replica 632 to be implemented in a different availability zone, data center, or network spine, in response to an IO load from the availability zone, data center, or network spine for intermediate volume 616 exceeding a threshold IO load. In some embodiments, a block-based storage service, such as block-based storage service 610 may populate target volumes in a particular availability zone, data center, or network spine, with an intermediate volume or intermediate volume replica located in the same availability zone, data center, or network spine or with an intermediate volume located more proximate to the target volumes than one or more other intermediate volume replicas. In some embodiments, intermediate volume replica 632 may be populated with snapshot data stored on resource hosts 612a through 612n that is replicated to intermediate volume 632. Also, in some embodiments, intermediate volume replica 632 may be populated with snapshot data from resource host 652 of object-based storage service 650. For example, if intermediate volume 616 is experiencing a high level of IO load, it may be advantageous to avoid placing additional load on intermediate volume 616 by populating intermediate volume replica 632 from snapshot 654 stored on resource host 652 of object-based storage service 650. Conversely, in other situations it may be advantageous to populate intermediate volume replica 632 from data already stored in block-based storage service 610, because intermediate volume replica 632 may be populated more quickly when being populated from data already stored in block-based storage service 610.

Also, any number of target volumes may be populated with snapshot data from intermediate volume 616 and intermediate volume replica 632, concurrently or at different times. For example, target volumes 622, 624, and 626 are populated with snapshot data from intermediate volume 616. Also, target volumes 638 and 640 are populated with snapshot data from intermediate volume replica 632. The population of a target volume may include snapshot data being read from intermediate volume 616 and being stored in respective volume partitions of the target volumes, such as volume partitions 620a and 620b implemented on resource hosts 618a and 618b that make up target volume 622. Also, snapshot data from intermediate volume 616 may be concurrently read and stored to volume partition 620c implemented on resource host 618c that makes up target volume 624 and concurrently read and stored to volume partition 620n implemented on resource host 618n that make up target volume 626. In a similar manner, population of target volumes in another portion of the provider network 600 may include snapshot data being read from intermediate volume replica 632 and being stored in respective volume partitions of the target volumes, such as volume partitions 636a implemented on resource hosts 634a that implements target volume 638. Also, snapshot data from intermediate volume replica 632 may be concurrently read and stored to volume partition 636n implemented on resource host 634n that makes up target volume 640.

Figure 7:
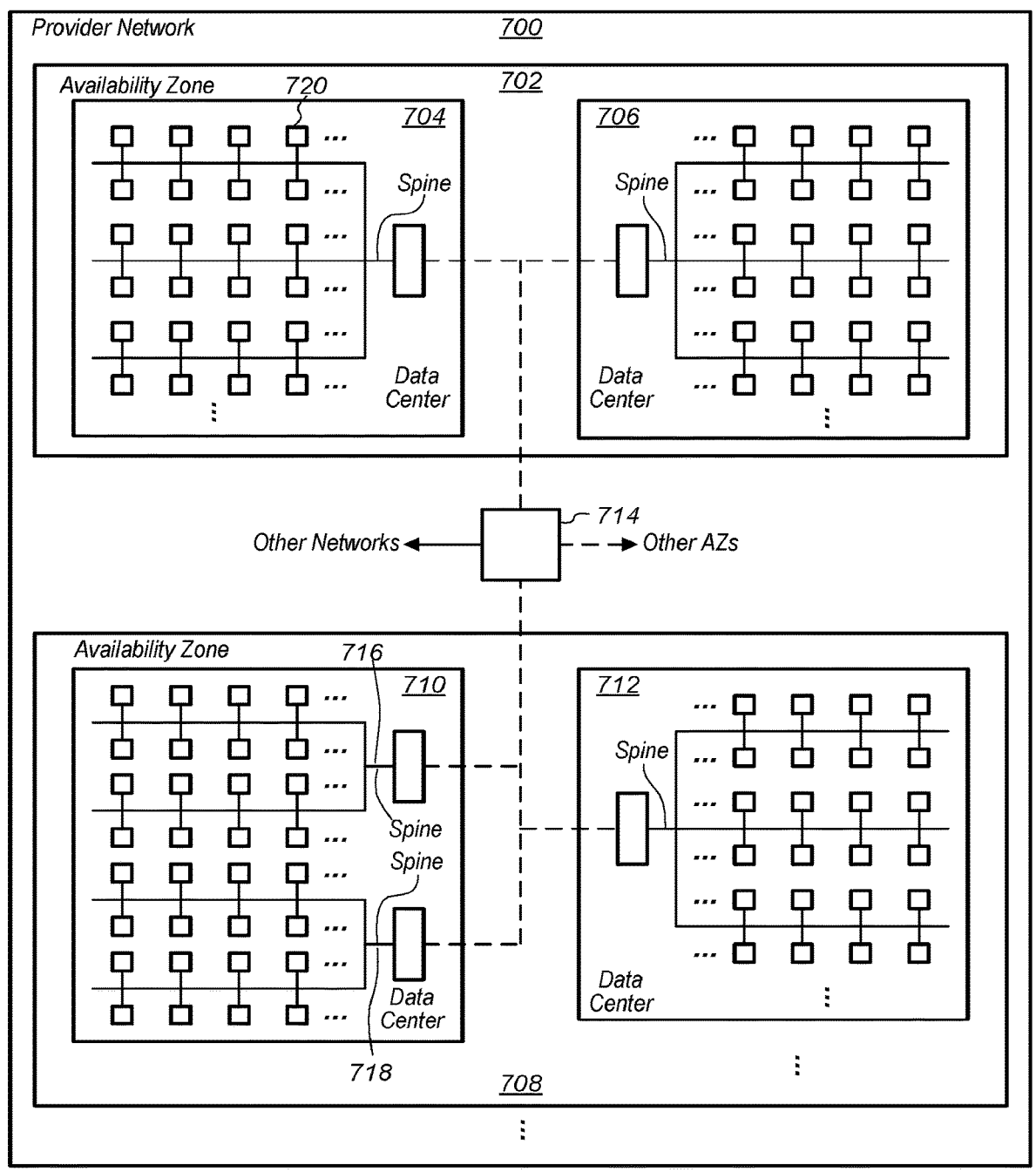
FIG. 7 is a block diagram illustrating a provider network comprising multiple 30 availability zones, data centers, and network spines, according to some embodiments.

FIG. 7 is a block diagram illustrating a provider network comprising multiple availability zones, data centers, and network spines, according to some embodiments.

Provider network 700 includes availability zone 702 and 708. Availability zone 702 includes data centers 704 and 706, which each include a single network spine. Availability zone 708 includes data centers 710 and 712. Data center 712 includes a single network spine, and data center 710 includes two network spines, spine 716 and 718. Provider network 700 may be a similar provider network as any of provider networks 100, 300, 400, 500, or 600 described above. In some embodiments, each of the spines included in data centers 704, 706, 710, and 712 may include storage hosts, compute hosts, and a networking device, such as a router. In some embodiments, as indicated by ellipses, a network spine may include any number of storage hosts and/or compute hosts. Also, as indicated by ellipses, in some embodiments, a network spine may include any number of aisles of racks that include compute and/or storage servers that function as compute hosts and/or storage hosts. For example, data center 704 may include any number of racks 720 that include compute and/or storage servers mounted in the racks and organized into aisles in data center 704. In some embodiments, a given one of racks 720 may include compute servers that function as compute hosts, storage servers that function as storage hosts, or a combination of types of resources, e.g. both compute and storage servers that function as both compute and storage hosts.

In some embodiments, a provider network such as provider network 700, may include a transit center, such as transit center 714. A transit center, such as transit center 714, may include one or more large scale routers or other types of networking devices. A transit center, such as transit center 714, may provide connections and routing between network spines such as the different network spines in data centers 704, 706, 710, and 712 and network spines in other availability zones of a provider network. Also, a transit center may provide connections to other networks such as client networks or public networks, such as the Internet.

Figure 8:
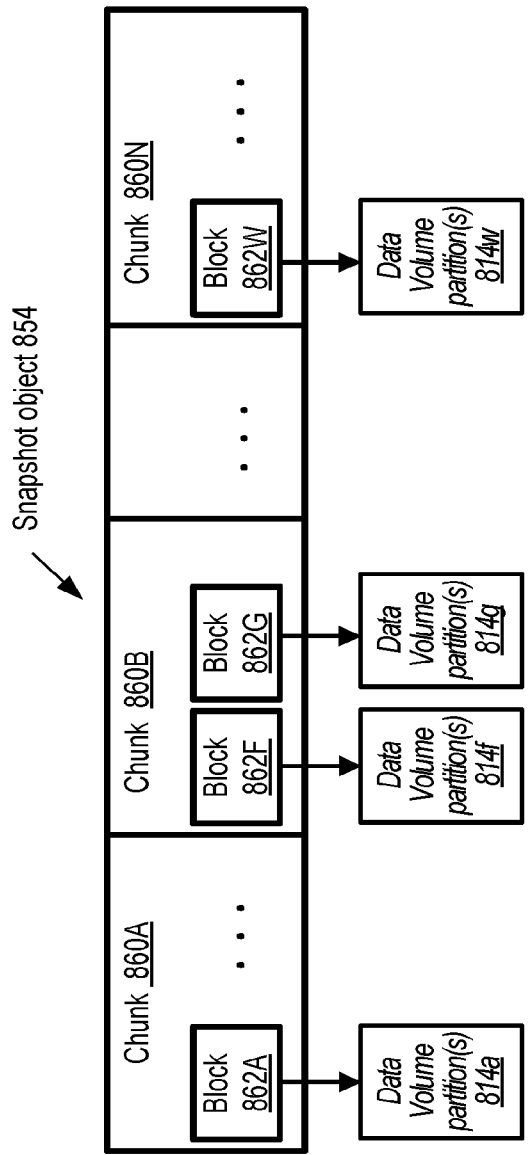
FIG. 8 illustrates chunks and blocks of a snapshot object, according to some embodiments.

FIG. 8 illustrates chunks and blocks of a snapshot object, according to some embodiments.

In at least some embodiments, the units of data transfers to and from a storage repository service, such as any of the object-based storage services described above, may differ from the units (e.g. the block size) in which data is read and written by the compute server instances. For example, in one implementation, data transfers to/from a repository service may be performed in multiples of four-megabytes, while the block size used for accessing volume contents may be four kilobytes or even 512 bytes. Data may be transferred in larger units than typical block sizes to reduce networking overhead, for example. The units of data transfer to and from the repository service may be referred to as "chunks" herein.

As shown, a snapshot object 854 may comprise a plurality of chunks 860, such as chunks 860A, 860B . . . 860N, each of which may in at least some implementations comprise a plurality of data blocks. Thus, in the depicted example, chunk 860A includes at least block 862A, chunk 860B includes blocks 862F and 862G, and chunk 860N includes block 860N.

Figure 9:
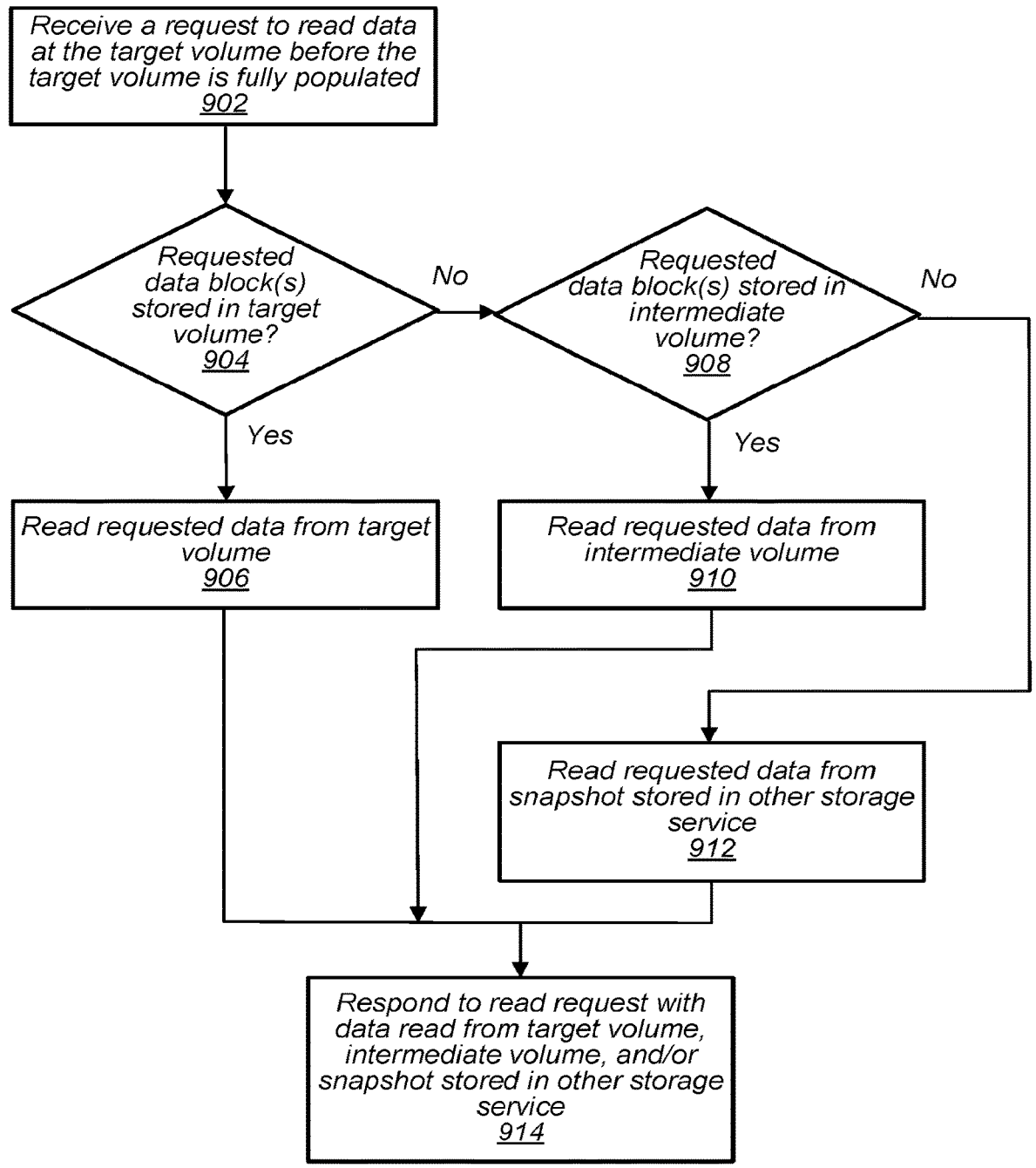
FIG. 9 is a high-level flowchart illustrating various methods and techniques for reading data from a target volume while the target volume is being populated with accelerated snapshot data, according to some embodiments.

FIG. 9 is a high-level flowchart illustrating various methods and techniques for reading data from a target volume while the target volume is being populated with accelerated snapshot data, according to some embodiments.

At 902, a request to read data at a target volume is received before population of the target volume with snapshot data from an intermediate volume of an accelerated snapshot has completed.

At 904, it is determined whether one or more data blocks targeted by the read request are stored in the target volume. If the data blocks targeted by the read request are stored locally at the target volume, at 906, the requested data is read from the target volume. If the data blocks targeted by the read request are not stored locally at the target volume (e.g. have not yet been populated in the target volume), it is determined at 908 whether the data blocks targeted by the read request are stored in the intermediate volume of the accelerated snapshot. If so, the requested data is read from the intermediate volume at 910. If the data blocks targeted by the read request have not been populated in the intermediate volume (and also have not been populated in the target volume), at 912 the requested data is read from the snapshot stored in the other storage service, such as a storage repository service, such as an object-based storage service.

At 904, the read request is responded to with data read from the target volume, intermediate volume, and/or the snapshot object stored in the other storage service.

Figure 10:
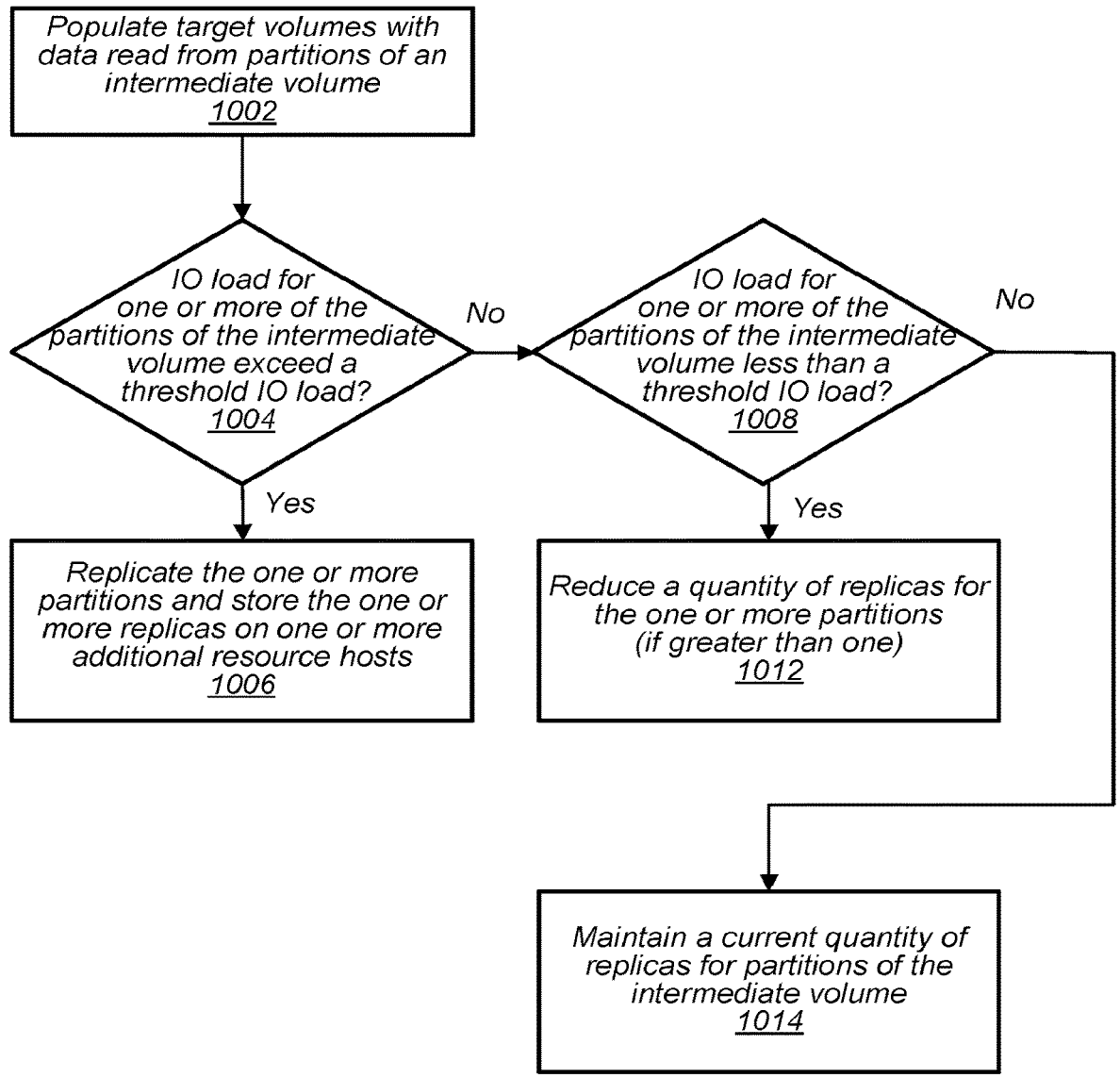
FIG. 10 is a high-level flowchart illustrating various methods and techniques for scaling up or down intermediate volume partitions of an accelerated snapshot, according to some embodiments.

FIG. 10 is a high-level flowchart illustrating various methods and techniques for scaling up or down intermediate volume partitions of an accelerated snapshot, according to some embodiments.

In some embodiments, a storage service manager may scale up or down volume partitions of an intermediate volume. For example a volume partition that has become a hot spot may be replicated and IO load directed at the volume partition may be distributed across the original volume partition and one or more replicas.

At 1002, target volumes are populated with data read from partitions of an intermediate volume. At 1004, it is determined if an IO load for one or more of the partitions of the intermediate volume exceeds a threshold IO load. If so, at 1006, the one or more partitions are replicated, and the replicas are stored on different resource hosts than the resource host(s) that store the partitions being replicated. This distributes the IO load of the original partition across one or more additional resource hosts.

If the IO load of the partitions of the intermediate volume do not exceed the threshold IO load at 1004, at 1006 it is determined whether an IO load for replicated partitions of the intermediate volume falls below a minimum threshold IO load. If so, at 1012, a quantity of replicas implemented for one or more partitions with IO loads below the minimum threshold IO load is reduced (if the total number of replicas for the partition is greater than one). If there is only a single partition, the partition will be maintained for the intermediate volume. If the IO load for the partitions of the intermediate volume is below the upper IO threshold load but above the minimum IO threshold load, at 1014 the current quantity of replicas for the partitions of the intermediate volume may be maintained.

Figure 11:
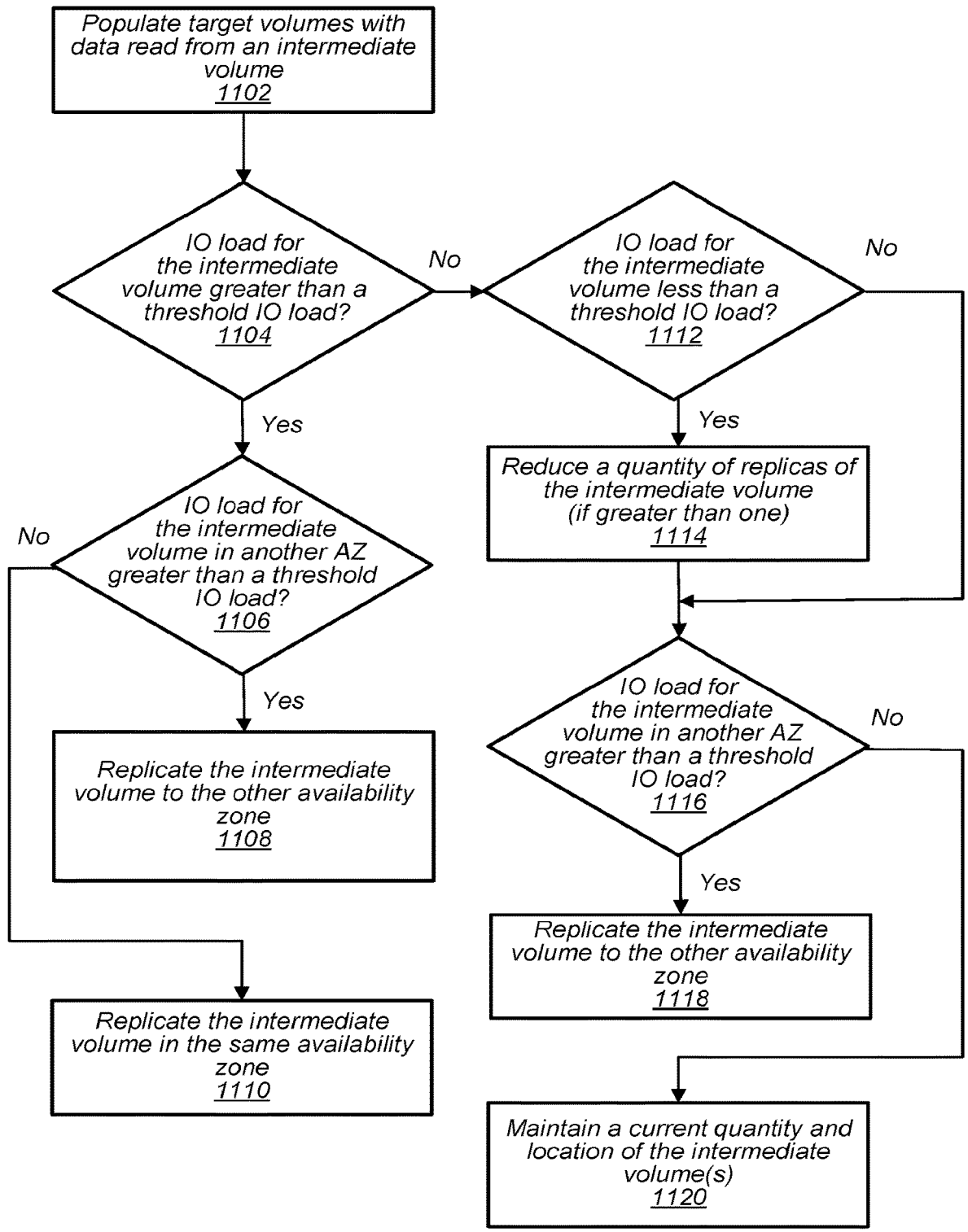
FIG. 11 is a high-level flowchart illustrating various methods and techniques for scaling up or down a quantity and/or location of intermediate volume replicas of an accelerated snapshot, according to some embodiments.

FIG. 11 is a high-level flowchart illustrating various methods and techniques for scaling up or down a quantity and/or location of intermediate volume replicas of an accelerated snapshot, according to some embodiments.

In some embodiments, in addition to or instead of replicating volume partitions of an intermediate volume, a storage service manager may cause whole intermediate volumes to be replicated. In some embodiments, multiple replicas of an intermediate volume may be maintained in a same portion of a provider network, such as an availability zone, data center, or network spine. For example, a customer located in a particular portion of a provider network may populate a large number of target volumes from an accelerated snapshot, such that in order to meet demand multiple intermediate volumes are needed. Also, in some embodiments, replicas of an intermediate volume may be maintained in different portions of a provider network, wherein each intermediate volume replica is used to populate target volumes implemented in the portion of the provider network where the intermediate volume replica is located.

At 1102, target volumes are populated with data read from an intermediate volume of an accelerated snapshot. At 1104, it is determined whether an IO load for the intermediate volume is greater than a threshold IO load. Note that in some embodiments, a threshold IO load for replicating a full intermediate volume may be a different threshold IO load than a threshold IO load for replicating a volume partition as discussed above in regard to FIG. 10. If the IO load of the intermediate volume exceeds the threshold IO load, at 1106, it is determined whether an IO load for the intermediate volume in another availability zone (or data center, or network spine) is greater than another threshold IO load. If not, the intermediate volume is replicated in the same availability zone (or data center, or network spine) at 1110. However, if the IO load in another availability zone (or data center, or network spine) is greater than the threshold IO load, at 1108, the intermediate volume is replicated, wherein the replica is stored in the other availability zone (or data center, or network spine) with the high IO loa.

If the IO load for the intermediate volume does not exceed the threshold IO load at 1104, it may be determined at 1112 whether an IO load for an intermediate volume with one or more replicas is less than a minimum threshold IO load. If so, a quantity of replicas of the intermediate volume may be reduced at 1114.

At 1116 it may be determined whether an IO load for the intermediate volume from another availability zone (or data center, or network spine) is greater than a threshold IO load. This determination may be made even for intermediate volumes that do not exceed the threshold IO load at 1104, or for intermediate volumes that have a number of replicas reduced at 1114.

If the IO load for the intermediate volume from other availability zones (or data centers, or network spines) does not exceed the threshold IO load at 1116, a current quantity and location of intermediate volumes is maintained at 1120. However, if the IO load for the intermediate volume from one or more other availability zones (or data centers, or network spines) does exceed the threshold IO load at 1116, the intermediate volume may be replicated to the one or more other availability zones (or data centers, or network spines) at 1118.

Figure 12:
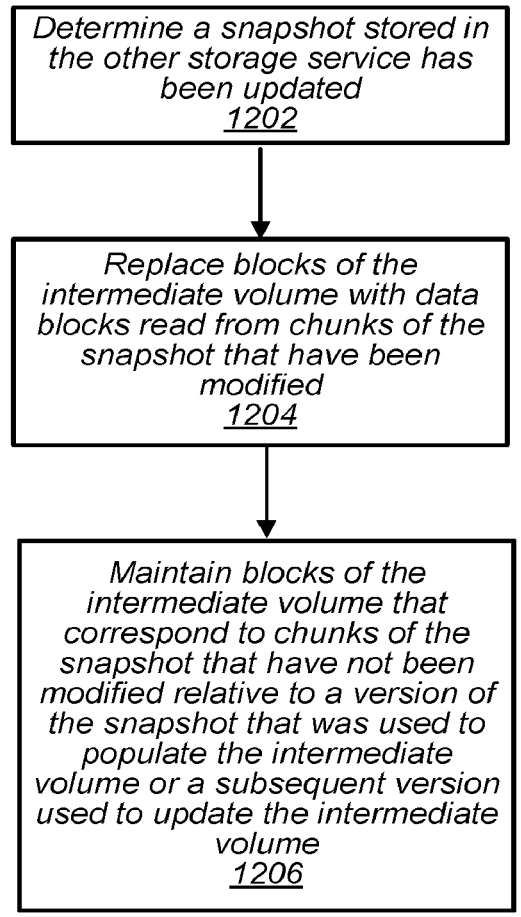
FIG. 12 is a high-level flowchart illustrating various methods and techniques for updating an accelerated snapshot, according to some embodiments.

FIG. 12 is a high-level flowchart illustrating various methods and techniques for updating an accelerated snapshot, according to some embodiments.

At 1202, it is determined that a snapshot object stored in another storage service, such as a storage repository service, such as an object-based storage service (that has been accelerated) has been updated. At 1204, blocks of the intermediate volume are replaced with updated blocks read from chunks of the snapshot object that have been updated or modified. At 1206, blocks of the intermediate volume that correspond to chunks of the snapshot object that have not been modified relative to a version of the snapshot object that was used to populate the intermediate volume or a subsequent version of the snapshot object that was used to update the intermediate volume are maintained in the intermediate volume without being updated or modified.

In some embodiments, updating an intermediate volume may comprise creating a new intermediate volume in a block-based storage service, populating the new intermediate volume with blocks from a previous version of the intermediate volume (for blocks that have not changed) and populating the new intermediate volume with other blocks read from a snapshot stored in a storage repository service (for blocks that have changed). In some embodiments, updating an intermediate volume may comprise replacing blocks of the intermediate volume with updated blocks read from a snapshot stored in a repository storage service (for blocks that have changed) and maintaining other blocks of the intermediate volume unchanged (for blocks that have not changed). Also, in some embodiments, updating an intermediate volume may comprise creating a new intermediate volume, fully populating the new intermediate volume with snapshot data read from a snapshot stored in a storage repository service, and, subsequent to the new intermediate volume being populated, discarding the previous version of the intermediate volume.

Figure 13A:
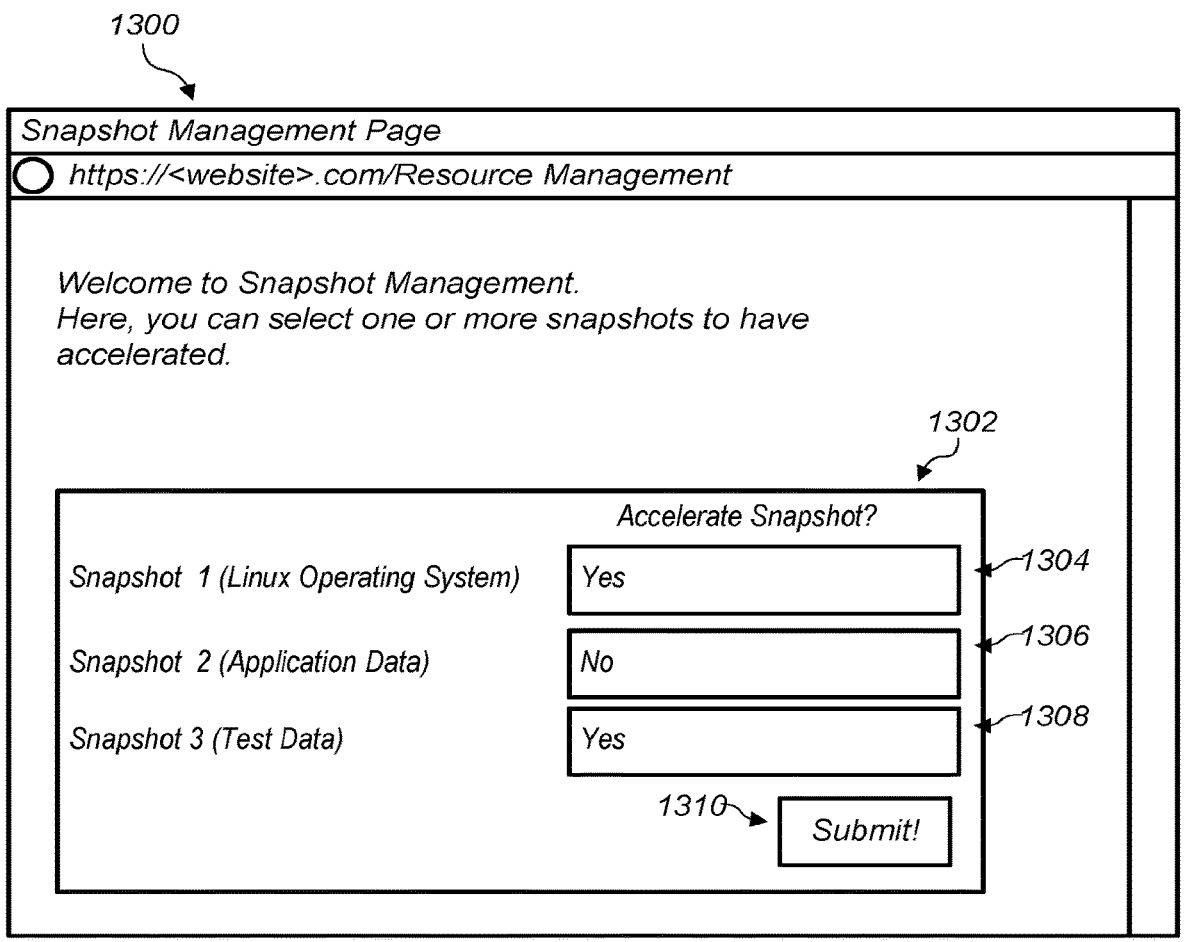
FIGS. 13A-13C are example graphical user interfaces for accelerating a snapshot, according to some embodiments.
Figure 13B:
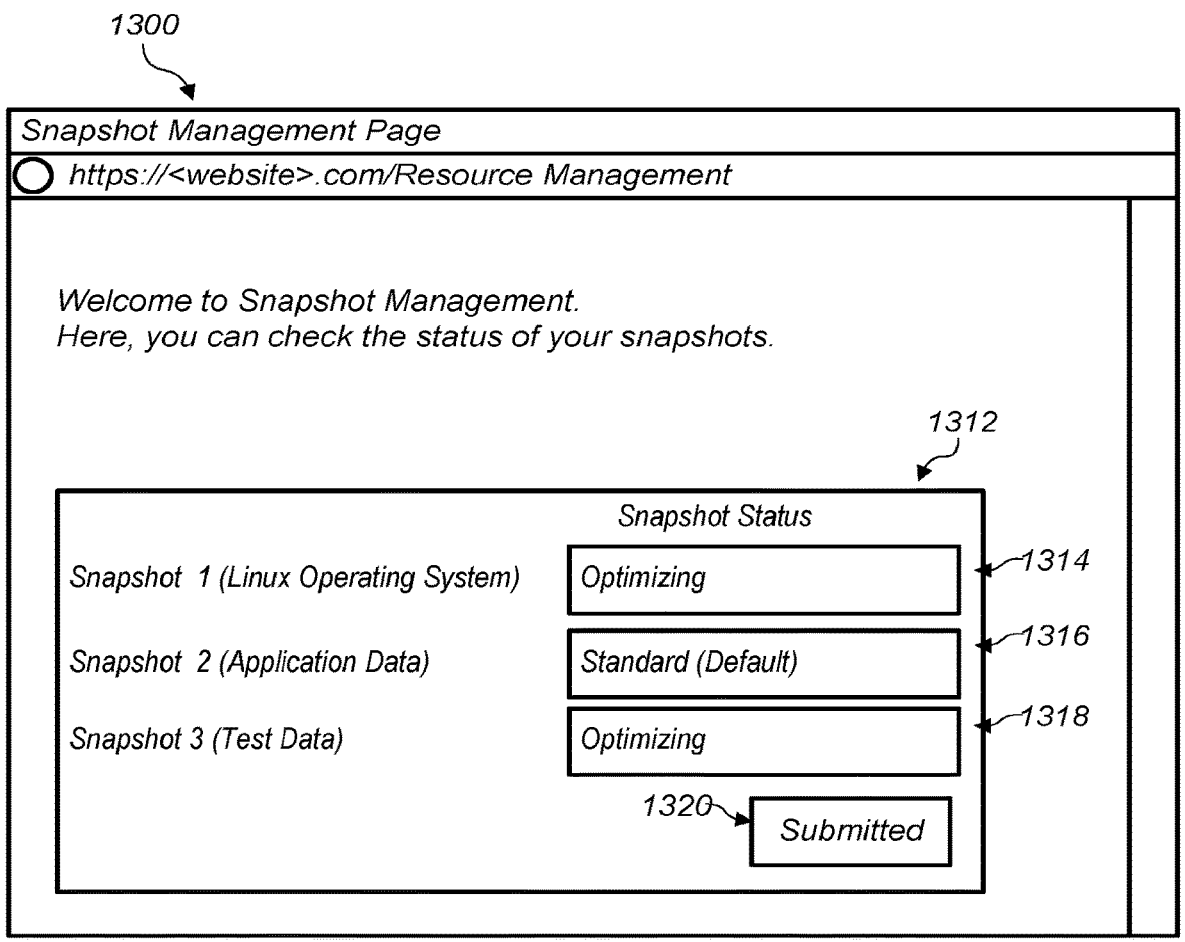
Figure 13C:
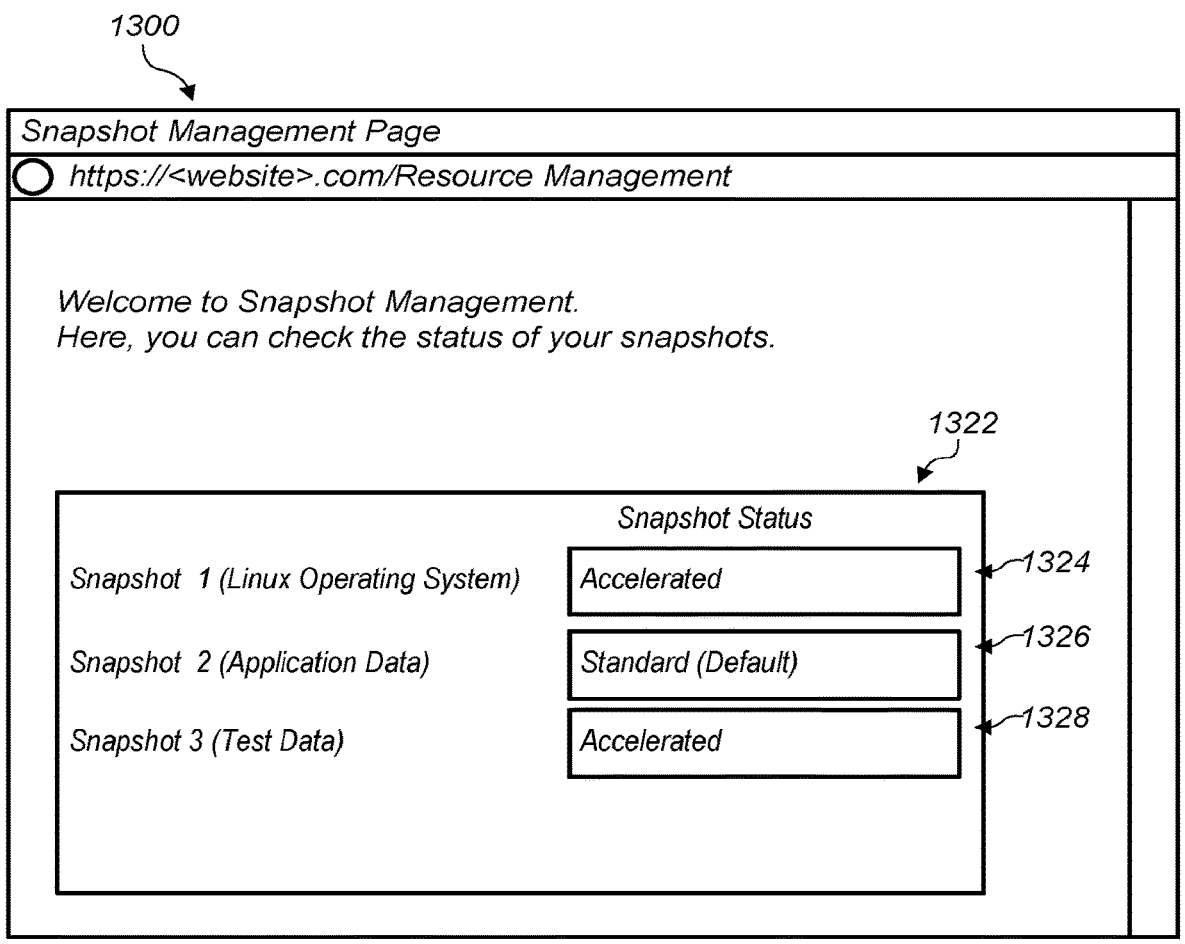

FIGS. 13A-13C are example graphical user interfaces for accelerating a snapshot, according to some embodiments.

As shown in FIG. 13A, user interface 1300 includes field 1302 that includes option boxes 1304, 1306, and 1308. In some embodiments, each option box may provide a client an option to accelerate a snapshot corresponding to the option box. For example, a client has selected to accelerate snapshot 1 via option box 1304 and to accelerate snapshot 3 via option box 1308. But, the client has not selected to accelerate snapshot 2. In order to initiate the acceleration of snapshots 1 and 3, the user may select the submit box 1310.

As shown in FIG. 13B, user interface 1300 may indicate a snapshot status for snapshots that are being accelerated. For example, field 1312 includes status boxes 1314, 1316, 1318, and 1320. Status box 1320 indicates that the request to accelerate snapshots 1 and 3 has been submitted. Also, status box 1314 and 1318 indicate that snapshots 1 and 3 are being optimized. In some embodiments, a snapshot may be indicated as being optimized while an intermediate volume for the snapshot is being populated. Also, status box 1316 indicates that the status of snapshot 2 is standard (e.g. not accelerated), which may be a default status for snapshot objects.

Once intermediate volumes for the accelerated snapshot have been populated, the status of the accelerated snapshot may be changed to "accelerated." For example, FIG. 13C includes field 1322 that includes status boxes 1324, 1326, and 1328. Status boxes 1324 and 1328 indicate that snapshots 1 and 3 have been accelerated, whereas status box 1326 indicates that snapshot 2 has a standard (e.g. non-accelerated) status.

Figure 14:
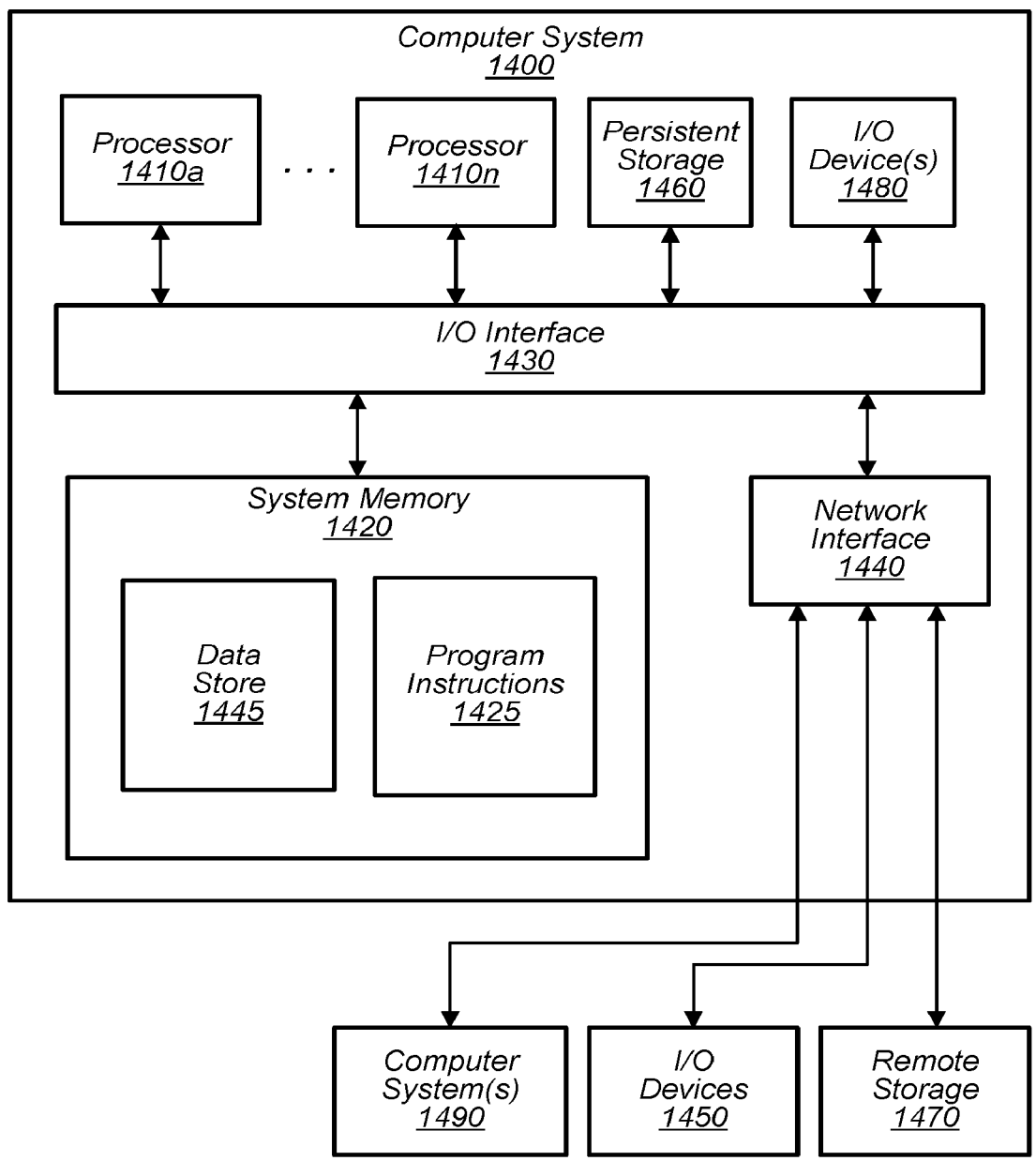
FIG. 14 is a block diagram illustrating an example computing system, according to some embodiments.

FIG. 14 is a block diagram illustrating an example computing system, according to some embodiments. For example, computer system 1400 may be configured to implement storage and/or compute nodes of a compute cluster, a data stores, and/or a client, in different embodiments. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.).

In the illustrated embodiment, computer system 1400 also includes one or more persistent storage devices 1460 and/or one or more I/O devices 1480. In various embodiments, persistent storage devices 1460 may correspond to disk drives, tape drives, solid state memory, other mass storage devices, block-based storage devices, or any other persistent storage device. Computer system 1400 (or a distributed application or operating system operating thereon) may store instructions and/or data in persistent storage devices 1460, as desired, and may retrieve the stored instruction and/or data as needed. For example, in some embodiments, computer system 1400 may host a storage system server node, and persistent storage 1460 may include the SSDs attached to that server node.

Computer system 1400 includes one or more system memories 1420 that are configured to store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR 10 RAM, synchronous dynamic RAM (SDRAM). Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a resource host, in different embodiments. In some embodiments, program instructions 1425 may implement multiple separate clients, nodes, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1445, which may be configured as described herein. In general, system memory 1420 (e.g, data store 1445 within system memory 1420), persistent storage 1460, and/or remote storage 1470 may store data blocks, replicas of data blocks, metadata associated with data blocks and/or their state, configuration information, and/or any other information usable in implementing the methods and techniques described herein.

In one embodiment, I/O interface 1430 may be configured to coordinate I/O traffic between processor 1410, system memory 1420 and any peripheral devices in the system, including through network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems 1490, for example. In addition, network interface 1440 may be configured to allow communication between computer system 1400 and various I/O devices 1450 and/or remote storage 1470. Input/output devices 1450 may, in some embodiments, include one or more display terminals, keyboards, keypads, touchpads, scanning devices, voice or optical recognition devices, or any other devices suitable for entering or retrieving data by one or more computer systems 1400. Multiple input/output devices 1450 may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A computer-implemented method comprising:
receiving a request to accelerate volume population of one or more target volumes of a block-based storage service from a snapshot stored in a storage repository service;
implementing an intermediate volume on one or more resource hosts of the block-based storage service, wherein input/output (O) capacity of the one or more target volumes is divided into at least a reserved portion for servicing IO requests from client devices and a remaining portion, and wherein the IO capacity of the intermediate volume is greater than the remaining portion of the IO capacity of the one or more target volumes;
populating the intermediate volume with data read from the snapshot; and
populating the one or more target volumes with data read from the intermediate volume.

2. The computer-implemented method of claim 1, wherein the one or more target volumes represent network-accessible block-level storage devices of one or more virtual machine instances that represent the client devices.

3. The computer-implemented method of claim 1, wherein implementing the intermediate volume comprises configuring the intermediate volume to be inaccessible to the client devices.

4. The computer-implemented method of claim 1, wherein implementing the intermediate volume on the one or more resource hosts of the block-based storage service comprises distributing the intermediate volume among a larger number of resource hosts than a number of resource hosts implementing individual target volumes of the one or more target volumes.

5. The computer-implemented method of claim 1, wherein the intermediate volume comprises a plurality of partitions, and wherein implementing the intermediate volume on the one or more resource hosts of the block-based storage service comprises distributing the plurality of partitions among the one or more resource hosts.

6. The computer-implemented method of claim 1, wherein populating the intermediate volume with data read from the snapshot comprises populating individual resources hosts of the one or more resource hosts with data from the snapshot at least partly in parallel.

7. The computer-implemented method of claim 1 further comprising, during population of the one or more target volumes with data read from the intermediate volume:
receiving, from a client device, a request to read a data block from the one or more target volumes;
determining that the data block has not yet been populated at the one or more target volumes; and
in response to the request:
transferring the data block from the intermediate volume to the one or more target volumes; and
transferring the data block from the one or more target volumes to the client device.

8. A system comprising:
one or more first resource host computing devices of a block-based storage service, the one or more first resource host computing devices including a processor and memory configured to implement a target volume of a block-based storage service, wherein input/output (O) capacity of the target volume is divided into at least a reserved portion for servicing IO requests from client devices and a remaining portion;
one or more second resource host computing devices of the block-based storage service, the one or more second resource host computing devices including a processor and memory configured, in response to a request to accelerate volume population of the target volume from a snapshot stored in a storage repository service, to:
implement an intermediate volume, wherein the IO capacity of the intermediate volume is greater than the remaining portion of the IO capacity of the one or more target volumes; and
populate the intermediate volume with data read from the snapshot; and
wherein the one or more first resource host computing devices implementing the target volume are configured to populate the target volume with the data read from the intermediate volume.

9. The system of claim 8, wherein the one or more second resource host computing devices implementing the intermediate volume are configured, to populate the intermediate volume with data read from the snapshot, to:
decompress the data read from the snapshot to result in a decompressed representation of the data; and
store the decompressed representation of the data read from the snapshot in the intermediate volume.

10. The system of claim 9, wherein to populate the target volume with the data read from the intermediate volume, the one or more first resource host computing devices implementing the target volume are configured to read the decompressed representation of the data read from the snapshot from the intermediate volume.

11. The system of claim 8, wherein the one or more first resource host computing devices implementing the target volume are configured to populate the target volume with the data read from the intermediate volume at least in part by reading data from the intermediate volume to individual resources hosts of the one or more resource hosts at least partly in parallel.

12. The system of claim 8, wherein the target volume is implemented as a first number of partitions distributed among the one or more first resource host computing devices, and wherein the intermediate volume is implemented as a second number of partitions distributed among the one or more second resource host computing devices, the second number being higher than the first number.

13. The system of claim 12, wherein the second number is an order of magnitude higher than the first number.

14. The system of claim 8, wherein one or more first resource host computing devices and the storage repository service are in communication over a first network, and wherein the one or more second resource host computing devices are in communication over a second network providing lower latency communications than the first network.

15. A system comprising:
one or more first resource host computing devices of a block-based storage service, the one or more first resource host computing devices including a processor and memory configured to implement a target volume of a block-based storage service, wherein the input/ output (O) capacity of the target volume is divided into at least a reserved portion for servicing IO requests from client devices and a remaining portion;

one or more second resource host computing devices of the block-based storage service, the one or more second resource host computing devices including a processor and memory configured to implement an intermediate volume, wherein the IO capacity of the intermediate volume is greater than the remaining portion of the IO capacity of the one or more target volumes;

one or more manager computing devices including a processor and memory configured to:
receive a request to accelerate volume population of the target volume from a snapshot stored in a storage repository service;
cause the intermediate volume to populate with data read from the snapshot; and
cause the target volume to populate with data read from the intermediate volume.

16. The system of claim 15, wherein the storage repository service is configured to provide data according to a file-level protocol, and wherein one or more second resource host computing devices implementing the intermediate volume are configured to provide data according to a block-level protocol.

17. The system of claim 16, wherein the block-level protocol provides higher efficiency communication over a communication channel than the file-level protocol.

18. The system of claim 16, wherein the one or more manager computing devices are further configured to:
receive a request to populate a second target volume from the snapshot; and
cause the second target volume to populate from the intermediate volume without reading data from the snapshot at the second target volume.

19. The system of claim 16, wherein the one or more manager computing devices are further configured to:
detect that a load on an individual resource host computing device of the one or more second resource host computing devices exceeds a threshold load;
add a new resource host computing device to the one or more second resource host computing devices; and
replicate data of the individual resource host computing device to the new resource host computing device.

20. The system of claim 16 wherein the one or more first resource host computing devices implementing the target volume are configured to, during population of the target volumes with data read from the intermediate volume:
receive, from a client device, a request to read a data block from the target volume;
determine that the data block has not yet been populated to the target volume; and
in response to the request:
retrieve the data block from the intermediate volume; and
transmit the data block to the client device.

* * * * *

UNITED STATES PATENT AND TRADEMARK OFFICE
CERTIFICATE OF CORRECTION

PATENT NO. : 11,093,148 B1
APPLICATION NO. : 16/550097
DATED : August 17, 2021
INVENTOR(S) : Greenwood et al.

Page 1 of 2

It is certified that error appears in the above-identified patent and that said Letters Patent is hereby corrected as shown below:

On the Title Page

On Page 2, Column 2, Item (56), Line 19, under Other Publications, delete "S3.latesl" and insert --S3/latest--.

In the Drawings

On sheet 1 of 16, FIG. 1, Line 20 (Approx.), delete "1'20n" and insert --120n--.

On Sheet 1 of 16, FIG. 1, Line 23 (Approx.), delete "158b" and insert --158a--.

On Sheet 1 of 16, FIG. 1, Line 23 (Approx.), delete "158c" and insert --158b--.

On Sheet 3 of 16, FIG. 3, Line 6 (Approx.), delete "312f" and insert --314f--.

On Sheet 4 of 16, FIG. 4, Line 6 (Approx.), delete "412e" and insert --414e--.

On Sheet 4 of 16, FIG. 4, Line 6 (Approx.), delete "412f" and insert --414f--.

On Sheet 4 of 16, FIG. 4, Line 6 (Approx.), delete "412n" and insert --414n--.

In the Specification

In Column 2, Line 5, delete "30 availability" and insert --availability--.

In Column 4, Line 18, delete "UpdateSnaphsot," and insert --UpdateSnapshot,--.

In Column 6, Line 65, delete "repositoy" and insert --repository--.

In Column 8, Line 51, delete "sofware" and insert --software--.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,093,148 B1

In Column 9, Line 4, delete "Per," and insert --Perl,--.

In Column 9, Line 5, delete "platforms)" and insert --platforms--.

In Column 9, Line 33, delete "118C" and insert --118c--.

In Column 12, Line 43, delete "partition." and insert --partitions.--.

In Column 16, Line 21, delete "load" and insert --IO load--.

In Column 16, Line 51, delete "volume" and insert --volume.--.

In Column 16, Line 64, delete "loa." and insert --load.--.

In Column 19, Line 10, delete "8608" and insert --860B--.

In Column 20, Line 44, delete "loa." and insert --load.--.

In Column 22, Line 56, delete "(SDRAM)." and insert --(SDRAM),--.

In Column 23, Line 20, delete "e.g," and insert --e.g.,--.

In Column 23, Line 27, delete "memory" and insert --memory.--.

In Column 23, Line 35, delete "(e.g," and insert --(e.g.,--.

In Column 24, Line 49, delete "operations though" and insert --operations.--.

In the Claims

In Column 25, Claim 1, Line 19, delete "(O)" and insert --(IO)--.

In Column 26, Claim 8, Line 7, delete "(O)" and insert --(IO)--.

In Column 27, Claim 15, Line 1, delete "(O)" and insert --(IO)--.